US010311996B2

(12) United States Patent
Sharma et al.

(10) Patent No.: US 10,311,996 B2
(45) Date of Patent: Jun. 4, 2019

(54) ELECTRICALLY INSULATING MATERIAL FOR THERMAL SPRAYED COATINGS MATCHING THE COEFFICIENT OF THERMAL EXPANSION OF THE UNDERLYING BODY

(71) Applicant: OERLIKON METCO (US) INC., Westbury, NY (US)

(72) Inventors: Atin Sharma, Westbury, NY (US); Johannes D. Rauch, Bad Salzungen (DE)

(73) Assignee: OERLIKON METCO (US) INC., Westbury, NY (US)

( * ) Notice: Subject to any disclaimer, the term of this patent is extended or adjusted under 35 U.S.C. 154(b) by 396 days.

(21) Appl. No.: 14/376,264

(22) PCT Filed: Jan. 24, 2014

(86) PCT No.: PCT/US2014/012866
§ 371 (c)(1),
(2) Date: Aug. 1, 2014

(87) PCT Pub. No.: WO2014/130202
PCT Pub. Date: Aug. 28, 2014

(65) Prior Publication Data
US 2015/0044486 A1 Feb. 12, 2015

Related U.S. Application Data
(60) Provisional application No. 61/766,960, filed on Feb. 20, 2013.

(51) Int. Cl.
*H01B 3/44* (2006.01)
*H01B 3/10* (2006.01)
(Continued)

(52) U.S. Cl.
CPC ......... *H01B 3/448* (2013.01); *C04B 35/053* (2013.01); *C04B 35/443* (2013.01);
(Continued)

(58) Field of Classification Search
CPC .................................................. C09K 3/1436
See application file for complete search history.

(56) References Cited

U.S. PATENT DOCUMENTS 3,833,387 A      9/1974  Reed et al.
4,593,007 A  *  6/1986  Novinski .............. C23C 4/06
                                                        427/447
(Continued)

FOREIGN PATENT DOCUMENTS

CN      102015211       4/2011
JP      H07-33538 A    2/1995
(Continued)

OTHER PUBLICATIONS

International Preliminary Report on Patentability for PCT/US2014/012866, dated Aug. 25, 2015.
(Continued)

*Primary Examiner* — Alexandre F Ferre
(74) *Attorney, Agent, or Firm* — Greenblum & Bernstein, P.L.C.

(57) ABSTRACT

Compositions and method for preparing thermally sprayed coatings are disclosed. The inventive compositions include at least one component that is electrically-insulating and/or non-subliming at thermal spray temperatures; and at least one component that has a high coefficient of thermal expansion. The invention also provides a compositions and methods for preparing a coating comprising a spinel, from materials that do not comprise a spinel; and also provides non-spinel materials used to prepare coatings comprising
(Continued)

spinel. The invention includes coatings made from the materials and methods; and articles comprising the coatings.

22 Claims, 19 Drawing Sheets

(51) Int. Cl.
*C23C 4/10* (2016.01)
*C04B 35/443* (2006.01)
*C04B 35/626* (2006.01)
*C04B 35/63* (2006.01)
*C04B 35/634* (2006.01)
*C04B 35/053* (2006.01)
*C04B 35/628* (2006.01)
*C23C 4/11* (2016.01)

(52) U.S. Cl.
CPC .... *C04B 35/6281* (2013.01); *C04B 35/62655* (2013.01); *C04B 35/62813* (2013.01); *C04B 35/6303* (2013.01); *C04B 35/63416* (2013.01); *C23C 4/10* (2013.01); *C23C 4/11* (2016.01); *H01B 3/10* (2013.01); *H01B 3/447* (2013.01); *C04B 2235/3206* (2013.01); *C04B 2235/3217* (2013.01); *C04B 2235/5436* (2013.01); *C04B 2235/5472* (2013.01); *C04B 2235/72* (2013.01)

(56) References Cited

U.S. PATENT DOCUMENTS

| 5,043,305 | A |  | 8/1991 | Tanaka et al. | |
| 5,266,536 | A | * | 11/1993 | Egerton | B82Y 30/00 |
| | | | | | 428/403 |
| 6,274,525 | B1 |  | 8/2001 | Zborowski et al. | |
| 6,596,041 | B2 | * | 7/2003 | Rosenflanz | B24D 3/06 |
| | | | | | 264/332 |
| 6,723,387 | B1 | * | 4/2004 | Kear | C23C 4/06 |
| | | | | | 106/286.8 |
| 6,723,442 | B1 | * | 4/2004 | Decker | C01F 7/162 |
| | | | | | 428/469 |
| 6,764,771 | B1 |  | 7/2004 | Heimberg et al. | |
| 2009/0235591 | A1 | * | 9/2009 | Yener | B24D 11/00 |
| | | | | | 51/308 |
| 2011/0033779 | A1 |  | 2/2011 | Badding et al. | |
| 2012/0040188 | A1 | * | 2/2012 | Davies | B22F 1/025 |
| | | | | | 428/404 |
| 2012/0177836 | A1 |  | 7/2012 | Doesburg et al. | |

FOREIGN PATENT DOCUMENTS

| JP | 11-286768 | 10/1999 |
| JP | 2001-214202 | 8/2001 |
| JP | 2003-503601 | 1/2003 |
| JP | 2003-115381 | 4/2003 |
| JP | 2009-523071 | 6/2009 |
| JP | 2010-150617 | 7/2010 |
| JP | 2012-232871 | 11/2012 |
| WO | WO 2009/117512 | 9/2009 |

OTHER PUBLICATIONS

"Responding to temperature changes" Carter et al. Ceramic Materials: Science and Engineering pp. 628-633.
"Chen Zengquan Application of anti-high temperature oxidation coating Welding and Joining, No. 7", Dec. 31, 1984, pp. 20-21, along with an english translation thereof.
Hongjin Fan et al., "Single-crystalline MgAl2O4 spinel nanotubes using a reactive and removable MgO nanowire template", Nanotechnology, vol. 17, Sep. 28, 2006, pp. 5157-5162.
Office Action issued in China Counterpart Patent Appl. No. 201480009572.4, dated Oct. 14, 2016, along with an english translation thereof.
Chinese Search Report issued in China Counterpart Patent Appl. No. 201480009572.4, along with an english translation thereof.
"NIST Property Data Summaries for Sintered Alumina".
G. Lallemand et al, "Fabrication Process of Spinel Powder for Plasma Spraying," J. Euro. Ceramic Soc., 18 (1998) 2095-2100.
EP Search Report dated Sep. 27, 2016; Application 14754605.5-1354 / 2958876 PCT/US2014012866.
Office Action issued in Japan Counterpart Patent Appl. No. 2015-558019, dated Jan. 19, 2018, along with an English translation thereof.

* cited by examiner

ELECTRICALLY INSULATING MATERIAL FOR THERMAL SPRAYED COATINGS MATCHING THE COEFFICIENT OF THERMAL EXPANSION OF THE UNDERLYING BODY

CROSS-REFERENCE TO RELATED APPLICATIONS

This application is a national stage application of PCT/US2014/012866, filed Jan. 24, 2014, which claims priority to U.S. provisional application 61/766,960, filed Feb. 20, 2013, the contents of both of which are expressly incorporated herein in their entireties.

BACKGROUND OF THE INVENTION

Many engineering applications require an insulating layer to be coated on a metallic body to provide certain functionality, for example, protection against chemical, mechanical, thermal or electrical influences. Most insulating materials in use today are ceramics. However, often due to the difference in the coefficients of thermal expansion between the ceramic coating and the underlying metallic body, high mechanical stresses are generated in the ceramic coating under thermal loads. These stresses readily lead to cracking and/or delamination of the coating. Therefore, a insulating material which has a coefficient of thermal expansion similar to that of the metallic material to be coated is desirable.

Metals generally have a coefficient of thermal expansion which is greater than 10 μm/m/K, therefore only a few oxides may be used for coating purposes. Stabilized zirconium oxide, for example, with coefficient of thermal expansion in the region of 11 μm/m/K is used in turbo-machinery components as a thermal barrier coating and in electrical devices such as solid oxide fuel cells as an ionic conductor (electrolyte) at high temperature. However, the resistance of zirconium oxide to attack from metallic or oxide melts is lower than that of a number of other materials [Ref U.S. Pat. Nos. 6,723,442; 6,764,771, incorporated herein by reference in their entireties]. Zirconium oxide also loses its electrical insulating properties at high temperature where ionic conduction predominates.

For application of the coating by thermal spray process, the insulating material additionally needs to have suitable properties to withstand the process conditions and form coatings with desired functionality. For example, MgO has a high melting point, sufficient resistance to melts, high electrical insulation and a coefficient of thermal expansion of 13.5 μm/m/K. This implies that MgO is also a suitable coating material for metals. However, MgO is not a suitable material for use in a thermal spraying process, since MgO decomposes at high temperatures which occur in such processes, and the decomposition products are volatile.

Ceramics which are produced from a mixture of MgO and $Al_2O_3$ have good properties for use in combination with various metals. Sintered ceramics produced from MgO and $Al_2O_3$ are commercially available. They have the advantages of being highly resistant to chemical, thermal and mechanical attacks and of having a coefficient of thermal expansion which lies in the region of 11 μm/m/K. However, ceramics of this type have only limited suitability as coating material, since in practice they are not suitable for coating by way of a thermal spraying method. In these ceramics too, the MgO of the ceramic evaporates at the high temperatures which occur during thermal spraying.

U.S. Pat. No. 6,723,442 describes a material based on the combination of $MgAl_2O_4$ spinel and MgO, a method of its production, a coating (or layer) produced from the material applied on a metallic body and the use of such coated metallic body as a component in a high temperature fuel cell. The material is described as comprising grains of MgO which are embedded in a matrix of the spinel $MgAl_2O_4$.

U.S. Pat. No. 6,764,771 describes a (metallic) turbine blade coated with a thermal barrier coating which is based on an admixture of a spinel material selected from a group of $CoMg_2O_4$, $CoFe_2O_4$, $CoCr_2O_4$, $CoTi_2O_4$, $CoAl_2O_4$, $NiMg_2O_4$, $NiTi_2O_4$, $TiMg_2O_4$, $TiFe_2O_4$, $TiCr_2O_4$, and $TiAl_2O_4$, and oxide material selected from a group of MgO, $HfO_2$, CoO, NiO, and $Cr_2O_3$ and/or combinations thereof.

US patent application publication US2011/0033779 (Feb. 10, 2011), incorporated herein by reference in its entirety, describes a several material compositions and combinations for use as insulation in solid oxide fuel cell (SOFC) systems.

There remains a need for materials and methods to deposit thermal spray coatings comprising, e.g., magnesium oxide and a spinel, preferably $MgAl_2O_4$.

SUMMARY OF THE INVENTION

It has surprisingly been found that it is possible to prepare a material to be used to provide temperature resistant, electrically insulating coatings with a coefficient of thermal expansion tunable to match that of the coated metallic material using thermal spray process. It has also been surprisingly found that it is possible to prepare a coating on a substrate, the coating comprising a spinel, from starting materials that do not comprise a spinel.

In a preferred embodiment, the non-spinel starting materials are thermally deposited onto a substrate. In a preferred embodiment, the starting material is injected into a hot zone where it is heated and/or melted and is then propelled toward a surface for deposition thereon. The heating may be accomplished by any suitable method and equipment, e.g., with use of high temperature (such as a flame, fuel burning, or an electric arc). Without being bound by theory, it is believed that the non-spinel compounds react on the way to the surface, thereby forming a spinel in transit to the surface. It is also possible that the spinel does not form until the ejected material deposits on the surface.

The present invention provides a material comprising a core portion comprising a first mixture, and an encasing portion comprising a second mixture, the first mixture being rich in a high-CTE material (component B1) and poor in a non-sublimating electrical insulator (component A1); the second mixture being rich in a non-sublimating electrical insulator (component A2) and poor in a high-CTE material (component B2); and wherein at least one of components A1 and B1 has average particle size up to about 100 microns; and at least one of components A2 and B2 has average particle size up to about 20 microns; wherein the encasing portion at least partially encases the core portion.

The present invention also provides a thermal spray coating prepared by thermally spraying the material onto a substrate.

The present invention also provides a method of manufacturing a thermal spray coating comprising: obtaining the material; obtaining a substrate; and forming a coating on the substrate by applying the material to the substrate by a thermal spray process.

Components A1 and A2 are preferably independently chosen from one or both of a) one or more oxide of trivalent or tetravalent metals, or b) one or more salt with binding properties. Preferably, components A1 and A2 are independently chosen from one or more of oxide of Al, In, Ga, Y, Sc, Mg, Si, Ti, Ge, Zr, Hf, Sn, Nb, Mn, or a rare earth metal. Preferably, components A1 and/or A2 comprise $Al_2O_3$.

Components B1 and B2 preferably have coefficients of thermal expansion at least about 10 μm/m/K. Components B1 and B2 are preferably independently chosen from one or more of a simple oxide, a double oxide, a triple oxide, an alkali metal halide, an alkaline metal halide, or a metal. Preferably, components B1 and/or B2 comprise, consist essentially of, or consist of, MgO.

Preferably, the material comprises a plurality of cores. Preferably, the cores comprise particles that are at least one of monolithic or an agglomerate of smaller particles. Preferably, the material comprises a plurality of agglomerated encased cores. Preferably, the core or plurality of cores further comprise an outer layer that is non-electrically conducting and non-sublimating. Preferably, the outer layer comprises one or both of a) one or more oxides of trivalent or tetravalent metals, or b) one or more salt with binding properties.

Preferably, the material comprises essentially no spinel. Preferably, the material further comprises a binder. Preferably, the material further comprises a dispersant.

Preferably, a thermal spray coating comprises one or more spinel. Preferably, the substrate of the thermal spray coating comprises iron, steel, aluminum, copper, Fe—Cr alloy, Cr-rich steel, cobalt, Co-alloy, nickel, Ni-alloy, bronze, or titanium.

Preferably, the thermal spray coating comprises a spinel. Preferably, the material does not comprise spinel, and the thermal spray coating comprises a spinel. Preferably, the material comprises $Al_2O_3$, and the thermal spray coating does not comprise $Al_2O_3$.

BRIEF DESCRIPTION OF THE INVENTION

Figure 1:
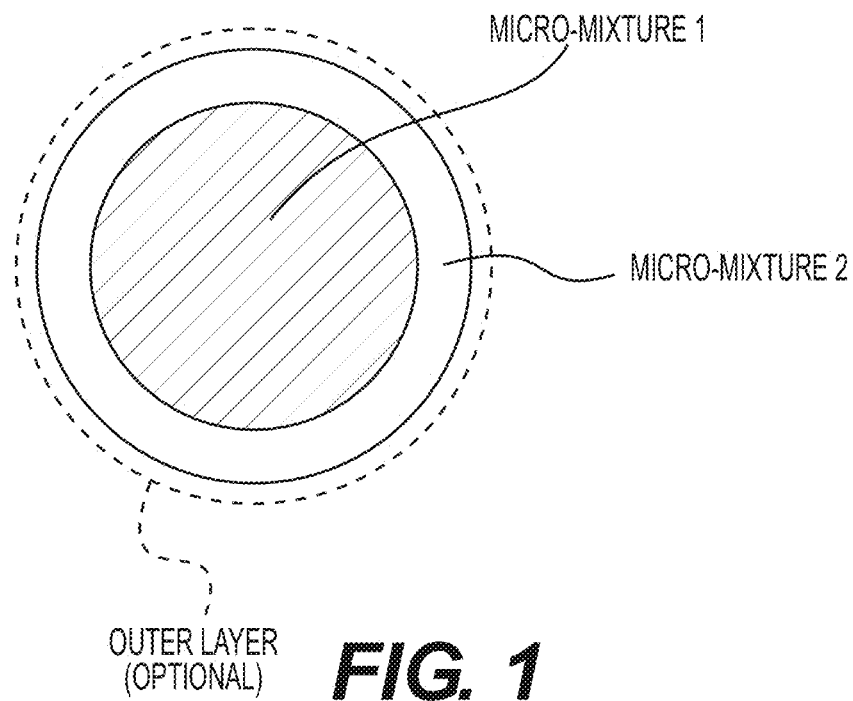
FIG. 1 is a schematic drawing illustrating a powder particle structure according to the current invention.

The present invention describes a material to be used to provide temperature resistant, electrically insulating coatings with a coefficient of thermal expansion tunable to match that of the coated metallic material using thermal spray process. The invention is based on a unique structure of the agglomerates which enables thermal spraying of some well known suitable materials which until now could not be processed by thermal spraying. The core of the material may be a metal or a ceramic, and these materials have a coefficient of thermal expansion>10 μm/m/K. Additionally, the core-coating or outer layer preferably electrically insulates the core material, and is suitable for thermal spray applications.

Preferably, there is no, or essentially no, spinel involved in this construct. This is in contrast to U.S. Pat. No. 6,723,442, which teaches spinel in the starting material. It is not necessary to start with a spinel material, or to use a starting material comprising a spinel. Rather, it is believed that a spinel forms with the heating and/or reheating of the material, in the flow of material toward the surface to be coated, or on the surface itself.

The starting material preferably comprises a powder comprising particles of two or more different compositions, the compositions comprising components A and/or B.

Component A is a component that is electrically insulating, and does not (or does not appreciably) sublimate or evaporate at material deposition temperature (an insulating non-sublimating component). If a Component A reacts with a Component B (described below), the reaction product is preferably electrically insulating. The reaction product preferably comprises a spinel. Component A preferably comprises any compound or material (other than a spinel) that is capable of reacting with a Component B under thermal spray conditions to form a spinel on a surface. Suitable Components A include oxides of trivalent or tetravalent metals, or a salt. Preferred oxides include one or more of $Al_2O_3$, $In_2O_3$, $Ga_2O_3$, $Y_2O_3$, $Sc_2O_3$, $SiO_2$, $TiO_2$, $GeO_2$, $ZrO_2$, $HfO_2$, $SnO_2$, $NbO_2$, $MnO_2$, or rare earth oxide (REO). Suitable salts for Component A include one or more of nitrates, sulfates, carbonates, acetates, phosphates, chlorides, and borates. Combinations of two or more Component A materials are also suitable. An especially preferred Component A comprises, consists essentially of, or consists of $Al_2O_3$.

The salt, when used, can preferably serve one or both of the following functions, preferably both. The salt preferably acts as a binder for larger particles. The salt preferably reacts with, or is capable of reacting with, Component B. The reaction product preferably includes a spinel. When Component A comprises, consists essentially of, or consists of, a salt, some preferred salts for Component A include:
nitrates as well as water containing nitrates and/or nitrites;
sulphates as well as water containing sulphates and/or sulphides;
carbonates as well a water containing carbonates;
acetates as well as water containing acetates;
phosphates as well as water containing phosphates and/or phosphides;
chlorides as well as water containing chlorides and/or chlorites;
borates as well as water containing borates.

Component B is a component other than Component A, that has a high coefficient of thermal expansion (CTE). Preferably, a Component B has a CTE close to, or greater than, the CTE of the substrate to which the coating is applied. In a preferred embodiment, the CTE of Component B is greater than or about 10 µm/K. Component B preferably includes any compound or material (other than a spinel) that is capable of reacting with Component A under thermal spray conditions to form a spinel on a surface. Preferably, the higher CTE of component B can be used to tune the CTE of the coating to match that of the substrate.

The substrate can be any material on which a thermal spray coating can be applied. Preferably, the substrate is or comprises a metal, preferably iron, steel, aluminum, copper, Fe—Cr alloys, Cr rich steels, cobalt, Co-alloys (e.g., cobalt-based superalloys), nickel, Ni-alloys (e.g., nickel-based superalloys), bronze, or titanium. The substrate can comprise any part on which a thermal spray coating can be applied. Preferably, the substrate can be a gas or jet turbine, a SOFC component, an electrical part in high temperature machinery, an engine component, a casting mold, a plasma etching chamber component, etc.

Component B preferably comprises a simple oxide (e.g. MgO) or a double oxide (e.g. $Li_2TiO_3$) or a multiple oxide (e.g. $Pb_xZr_{(1-x)}TiO_3$). An especially preferred Component B comprises, consists essentially of, or consists of, magnesium oxide (MgO). Another preferred Component B is an oxide with formula $Z_{(1-2)}MO_{3-4}$ where Z=an alkali metal (Li, Na, K, Rb, Cs), Ba, or Mg; M=a group IV element (Ti, Hf, Zr, Si, Ge, Sn, Pb) and O=oxygen. See also U.S. Pat. No. 3,833,387, incorporated herein by reference.

In another embodiment, component B comprises an alkali metal halide or an alkaline metal halide. A preferred halide is fluoride. See also U.S. Pat. No. 5,043,305, incorporated herein by reference in its entirety.

In another embodiment, component B comprises a metal or alloy having a high CTE. Some preferred examples include a group IV metal, a group VIII metal, a Group IB metal, a Group IIB metal, or any electrically conducting alloy of any of these, or comprising at least one of these.

When micro-mixtures 1 and 2 each comprise component A, component A in micro-mixture 1 can be the same as, or different from, component A in micro-mixture 2. Preferably, component A is the same in micro-mixtures 1 and 2. Similarly, when micro-mixtures 1 and 2 each comprise component B, component B in micro-mixture 1 can be the same as, or different from, component B in micro-mixture 2. Preferably, component B is the same in micro-mixtures 1 and 2.

As schematically shown in FIG. 1, one preferred embodiment comprises particles having a core rich (e.g., >50 mol %) in component B and poor (e.g., <50 mol %) in component A (micro-mixture 1). The core has a core-coating thereon that is rich (e.g., >50 mol %) in component A and poor (e.g., <50 mol %) in component B (micro-mixture 2). The particle may additionally comprise an optional outer layer. Either or both of micro-mixtures 1 or 2 can additionally comprise other components, such as non-spinel oxides. These particles may also additionally comprise an optional outer layer (e.g., component C). A mixture rich in Component A (or B) includes a composition of 100% A (or B). In a preferred embodiment, component A comprises $Al_2O_3$, component B comprises MgO, and component C comprises one or more of Co-oxide, Mn-oxide, ZnO, NiO, $TiO_2$, or $Cr_2O_3$.

As used herein, "rich" in a particular component means that the composition comprises a plurality, preferably a majority, mol percent of the mixture. Preferably, "rich" means at least 50 mol %, more preferably at least 60 mol %, 70 mol %, or 80 mol %, and includes 100%, or essentially 100%, of the component. Similarly, as used herein, "poor" in a particular component means that the composition comprises a minority mol percent of the mixture. Preferably, "poor" means less than 50 mol %, more preferably up to 40 mol %, 30 mol %, or 20 mol %, and includes none, or essentially none, of the component.

When component B comprises an electrically conductive material, it is preferred that any outer layer be electrically insulating. One preferred way to accomplish this comprises applying an outer layer to the core-shell particle, e.g., as shown in FIG. 1. The outer layer could comprise any suitable electrically insulating material component C. In a preferred embodiment, component C comprises, essentially consists of, or consists of, a non-sublimating electrical insulator, such as a component A material.

Another preferred way to accomplish this comprises using a micro-mixture 2 that is electrically insulating. Micro-mixture 2 can comprise electrically conductive material (e.g., a component B material), so long as micro-mixture 2 is not electrically conductive.

In a preferred embodiment (e.g., per FIG. 1), micro-mixture 1 comprises a component B-rich (>50 ml %) mix of A and B with particle sizes of either component <20 microns (preferably <5 microns). In a preferred embodiment, micro-mixture 2 comprises a component A-rich (>50 mol %) mix of A and B, with particle sizes of either component <20 microns (preferably <5 microns).

In another preferred embodiment (e.g., per FIG. 2), micro-mixture 1 comprises a component B-rich (>50 ml %) mix of A, B, and C, with particle sizes of either component <20 microns (preferably <5 microns). In a preferred embodiment, micro-mixture 2 comprises a component A-rich (>50 mol %) mix of A, B, and C, with particle sizes of either component <20 microns (preferably <5 microns). When a micro-mixture comprises components A, B and C, component A preferably comprises $Al_2O_3$, and component C preferably comprises a non-sublimating electrical insulator other than $Al_2O_3$. Several other structures and preferred embodiments are schematically shown in FIGS. 3-9.

Any amounts of Components A and B may be used to obtain a suitable coating on the surface, and may be adjusted by one of ordinary skill in the art using this disclosure as a guide. Preferably, the amounts of Components A and B used are suitable to form a coating comprising spinel and MgO. By regulating the relative amounts of Components A and B in the starting material, it is possible to regulate the proportion of MgO and spinel that are formed on the surface. Because the spinel and MgO generally have different coefficients of thermal expansion (CTEs), it is possible to control the CTE of the coating, preferably obtain a target CTE, by adjusting the proportions of A and B, e.g., in the core and/or in the core-coating layer.

The order of micro-mixtures 1 and 2 can be reversed as desired or required. That is, the core may comprise micro-mixture 2, and the core-coating may comprise micro-mixture 1. In a preferred embodiment, higher $Al_2O_3$ composition in the core-coating (e.g., $Al_2O_3$-rich core coating) may help to prevent evaporation losses of MgO during heating or spraying.

In another embodiment, by suitably choosing the ratios of Components A and B, the structure (spinel+MgO) may naturally be produced in the deposited coatings which will have the desired properties in terms of electrical insulation, coefficient of thermal expansion, or both.

Materials according to the present invention may also comprise other ingredients, such as binders or dispersants.

Any suitable amount of binder may be used to obtain desired binding of the material. A binder is optional, such that there is no particular lower limit on the amount of binder. Some salts (e.g., of Component A) have binding properties, which can reduce or eliminate any need for a binder. When used, the binder is typically used in an amount less than or about 15 parts by weight, more preferably less than or about 10 parts by weight, more preferably less than or about 6 parts by weight, more preferably 3 parts by weight, more preferably less than about 2 parts by weight, relative to 100 parts by weight of components A, B, and (if present) C. Some preferred embodiments have about 10, 6, 3, or 1 part by weight binder, or no binder. Some preferred binders include polyvinyl alcohol (PVA), povidone (PVP), carboxymethyl cellulose (CMC), paraffin wax, and combinations thereof.

A dispersant may optionally be used, e.g., in order to improve and/or facilitate preparation of the material. A dispersant is optional, such that there is no particular lower limit on the amount of dispersant. When used, dispersant is typically used in an amount less than about 2 parts by weight, more preferably less than about 1 parts by weight, relative to weight of components A, B, and (if present) C. Some preferred embodiments have about 0.5 part by weight dispersant. Any suitable dispersant can be used, and can be determined by one of ordinary skill in the art. Non-limiting preferred dispersants comprise an anionic polyelectrolyte, such as DISPEX® AA 4144 (manufactured by BASF), or NOPCOSPERSE® (available from San Nopco Limited, Japan).

In an embodiment an optional outermost layer (FIG. 1) can be extended to one or more of a very large number of other suitable elements and/or compounds. This layer when reacting with the inner layers can produce other desired compositions. For example, if the outer layer has CoO and the micro-mixture 2 layer has for example, pure $Al_2O_3$, they can produce $CoAl_2O_4$.

This same idea is applied in FIG. 1 (without the optional outer layer) which has only a core and a shell (core-coat) but each can have 3 possible components (A, B and C) where C can be extended to a very large number of other suitable elements and/or compounds.

Figure 2:
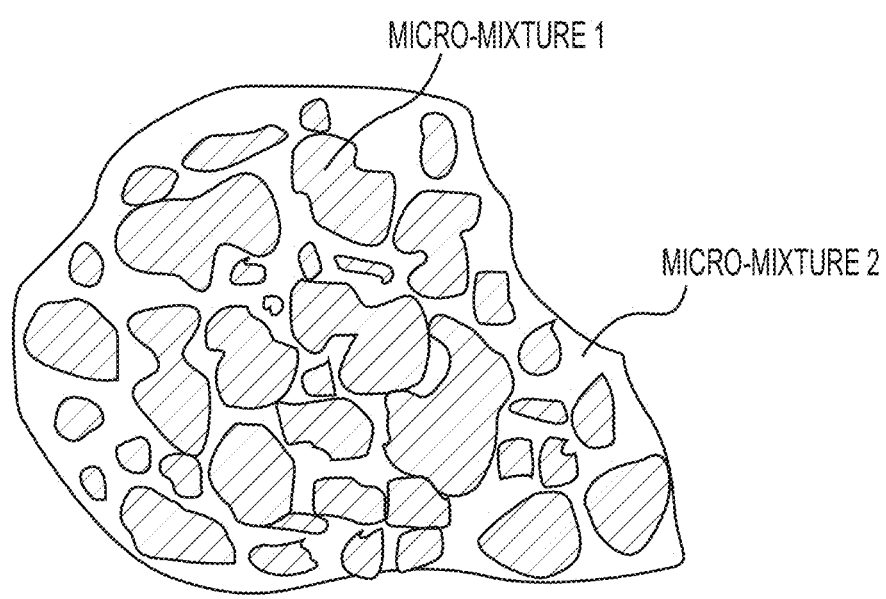
FIG. 2 is a schematic drawing illustrating a powder particle structure according to the current invention.

The shapes of the core and the coated particle (e.g., as schematically shown in FIGS. 1 and 2), are not limited, and can be of any shape or configuration. Additionally, as shown for example in FIG. 3, there can be multiple cores, and the core can be irregularly shaped.

Any thickness of the core-coat (e.g., micro-mixture 2) can be used. In a preferred embodiment, the thickness of the core-coat 2 is generally at least 0.1 microns, more preferably at least 1 or 2 microns. In a preferred embodiment, the thickness of the core-coat is up to 15 microns, more preferably 12 or 8 microns. A preferred range is 0.1-15 microns.

The particles may be of any size. The particles (e.g., as shown in FIGS. 1-9) may be monolithic or agglomerated. The particles are preferably of a size to permit use in thermal spray equipment to apply a coating on a surface. Without limiting the invention, as a general matter, average particle size will be less than 100 microns, more preferably less than 50 microns, more preferably less than 20 microns. As a general matter, the average particle sizes will be at least 0.5 microns, more preferably at least 1 micron, more preferably at least 4 microns.

In a preferred embodiment, for the micro-mixture 2, the particulate coating comprises an oxide, and does not comprise a salt.

In another preferred embodiment, the core is, or comprises, a metal, and the particle comprises an electrically insulating material coating, e.g., core-coat and/or outer layer.

Figure 9:
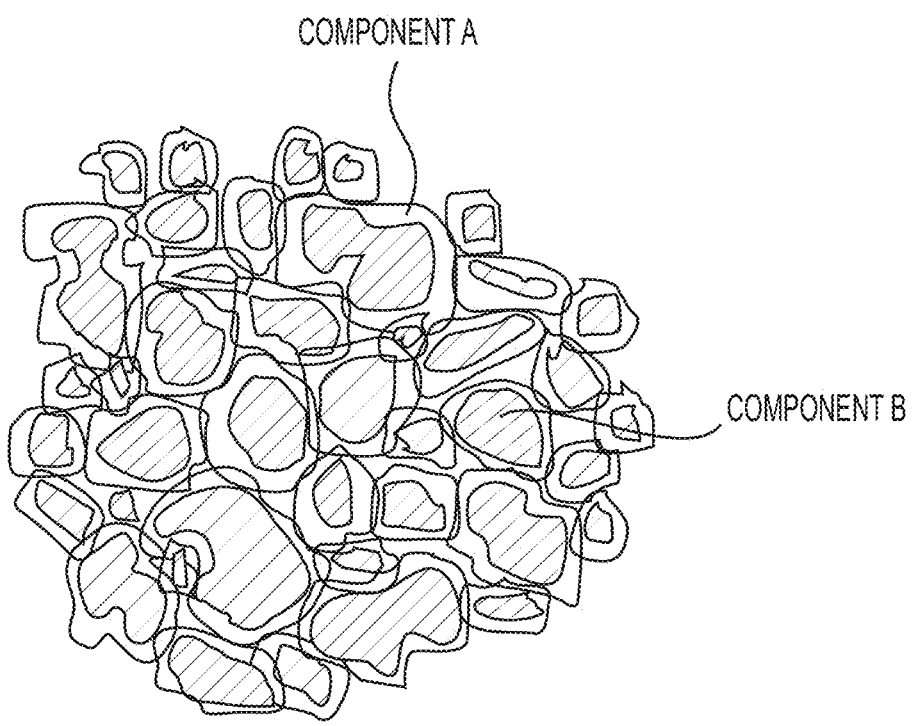
FIG. 9 is a schematic drawing illustrating a powder particle structure according to the current invention.
Figure 10A:
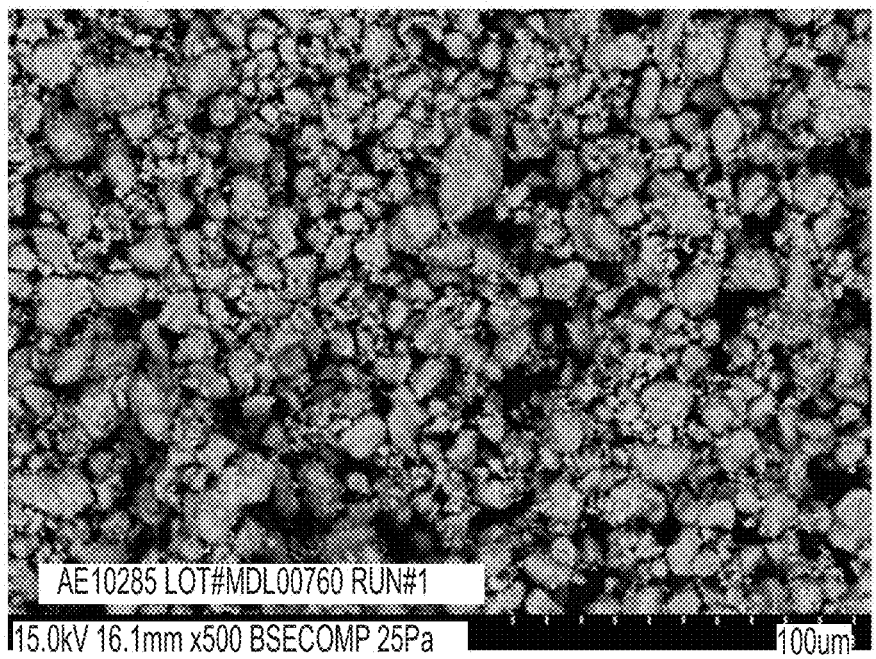
FIG. 10 shows the morphology and cross-section of a powder according to the present invention; SEM powder images (at 500×) for the MgO—$Al_2O_3$ "clad" powder (a) Morphology, (b) Cross section.
Figure 10B:
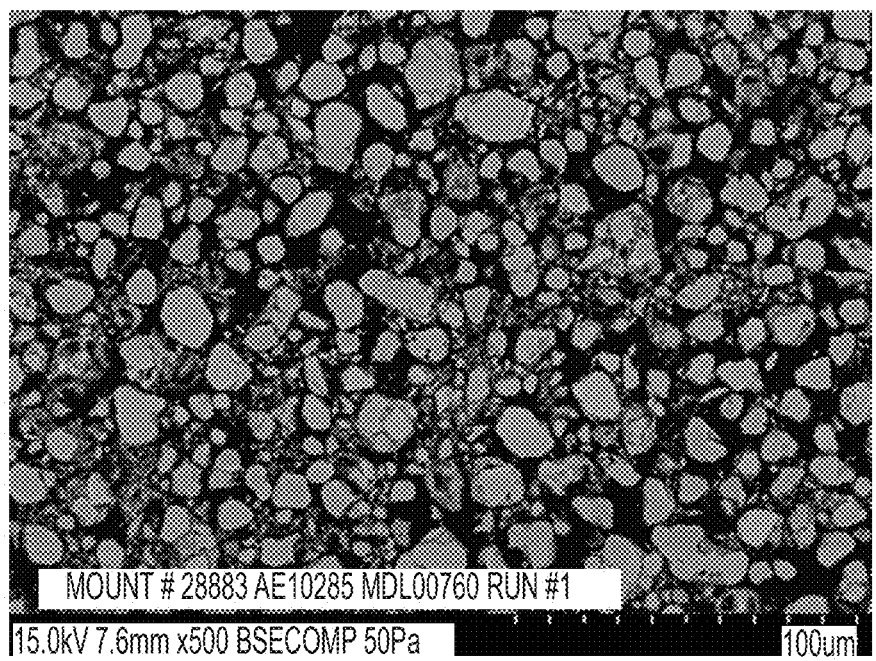
Figure 11A:
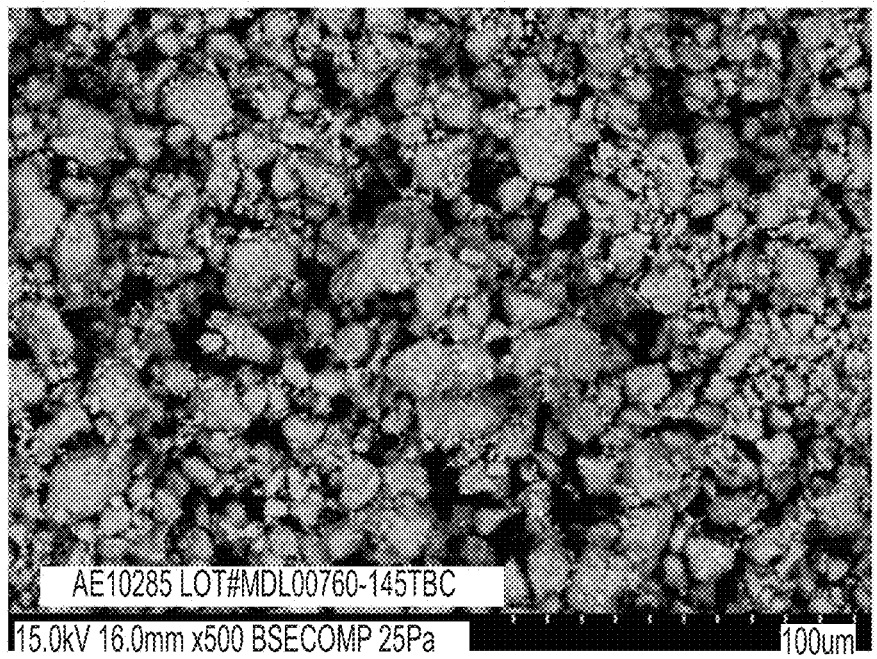
FIG. 11 shows the morphology and cross-section of a powder according to the present invention; SEM powder images (at 500×) for the MgO—$Al_2O_3$ "clad" powder (a) Morphology, (b) Cross section.
Figure 11B:
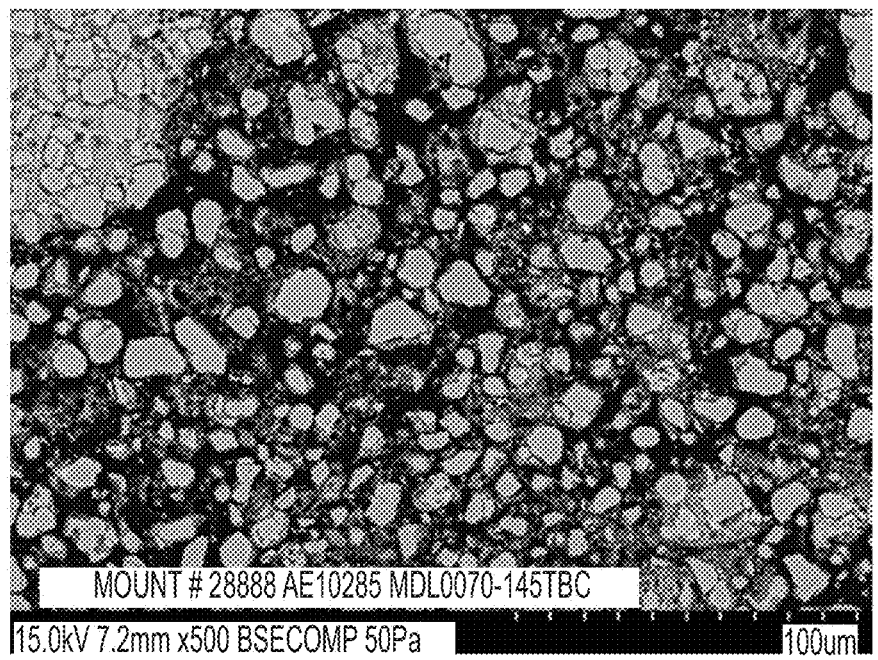
Figure 12A:
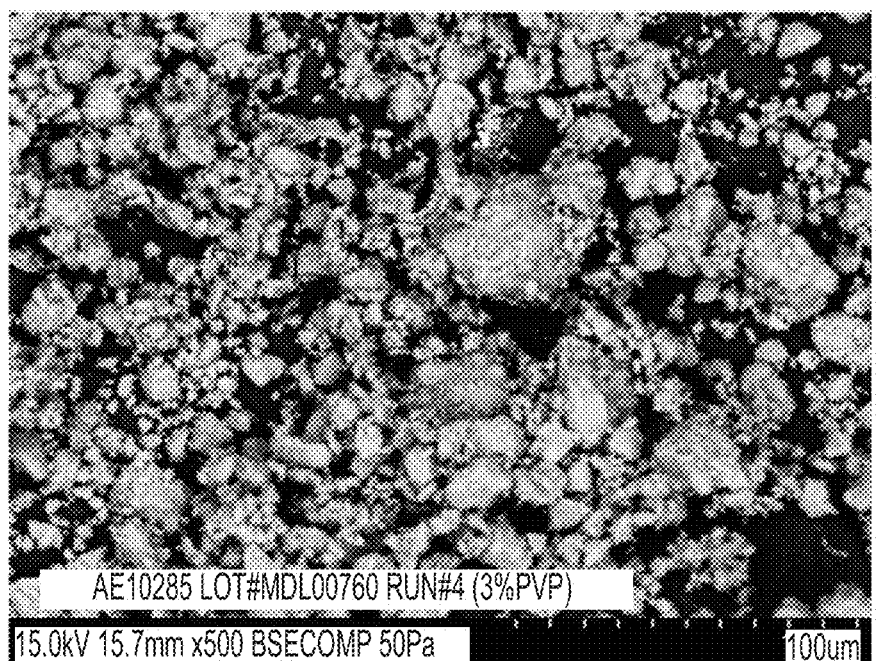
FIG. 12 shows the morphology and cross-section of a powder according to the present invention; SEM powder images (at 500×) for the MgO—$Al_2O_3$ "clad" powder (a) Morphology, (b) Cross section.
Figure 12B:
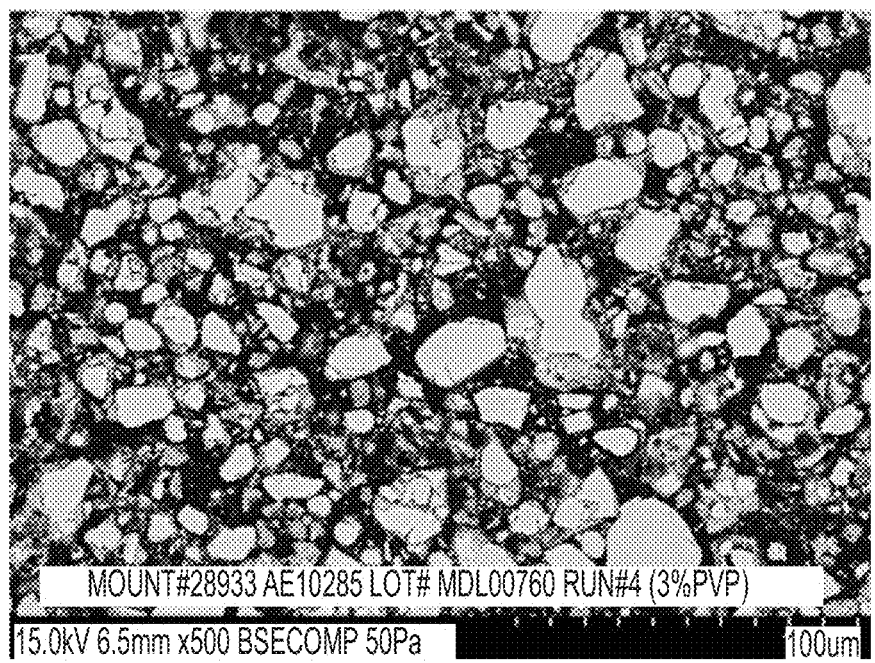
Figure 13A:
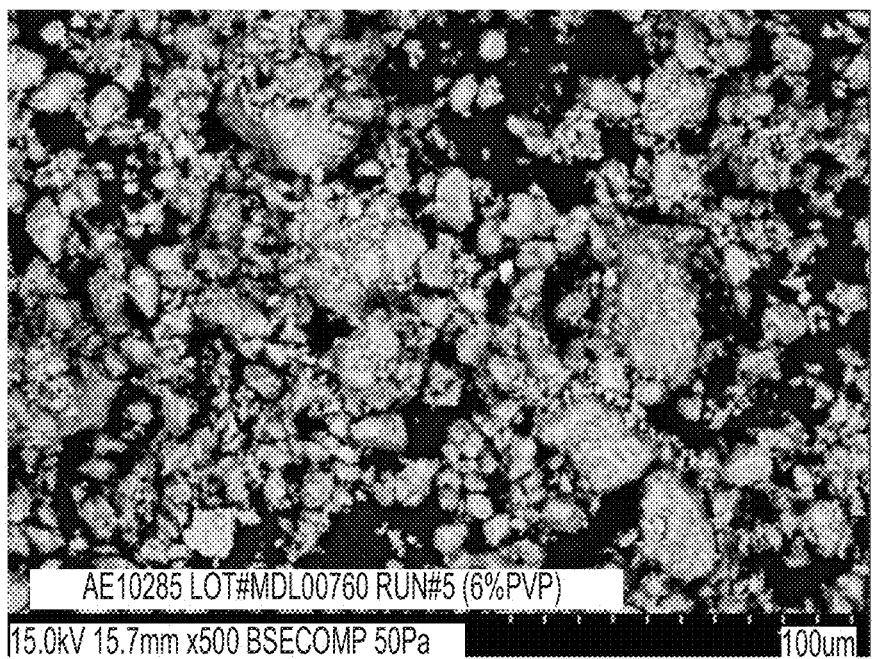
FIG. 13 shows the morphology and cross-section of a powder according to the present invention; SEM powder images (at 500×) for the MgO—$Al_2O_3$ "clad" powder (a) Morphology, (b) Cross section.
Figure 13B:
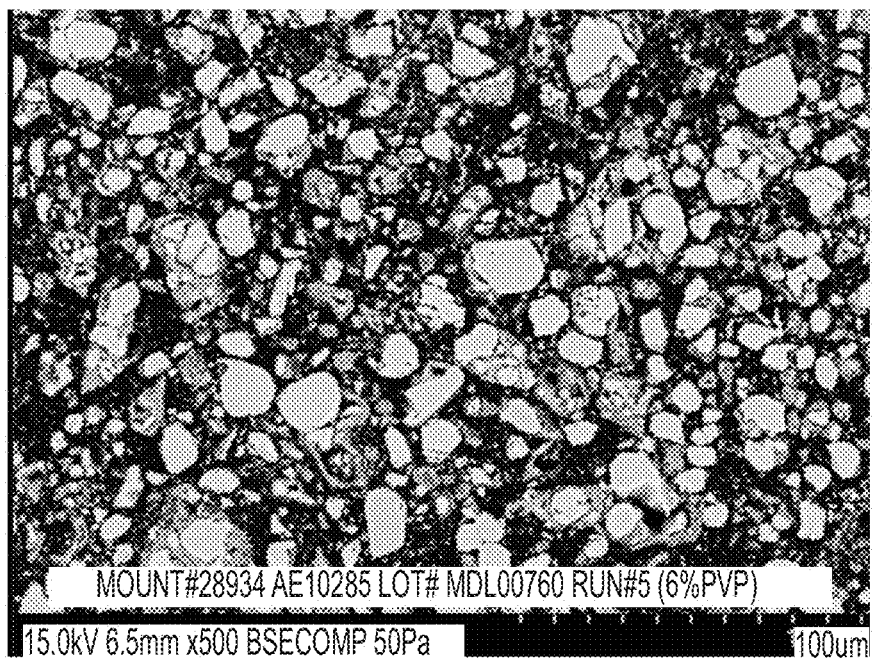
Figure 14A:
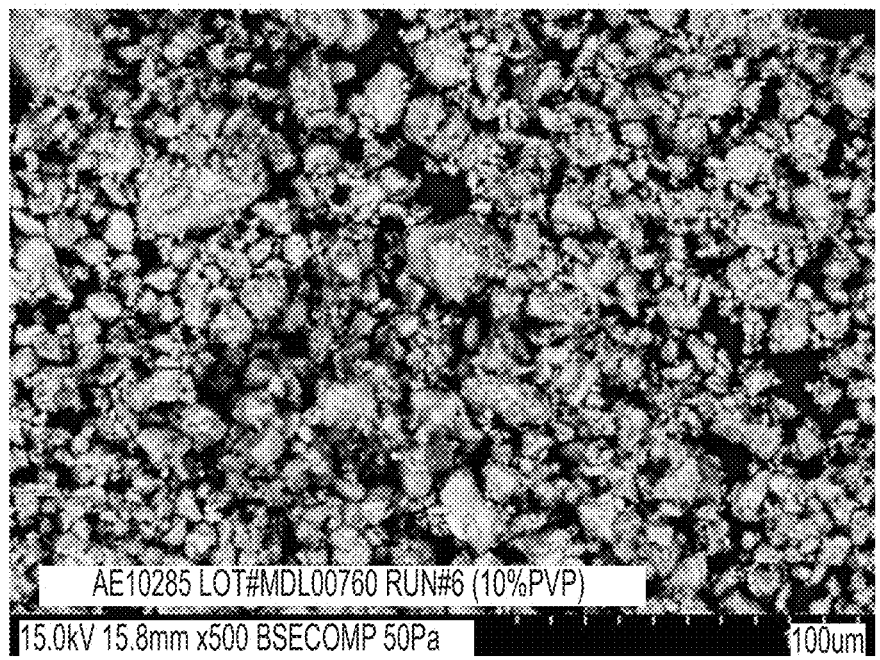
FIG. 14 shows the morphology and cross-section of a powder according to the present invention; SEM powder images (at 500×) for the MgO—$Al_2O_3$ "clad" powder (a) Morphology, (b) Cross section.
Figure 14B:
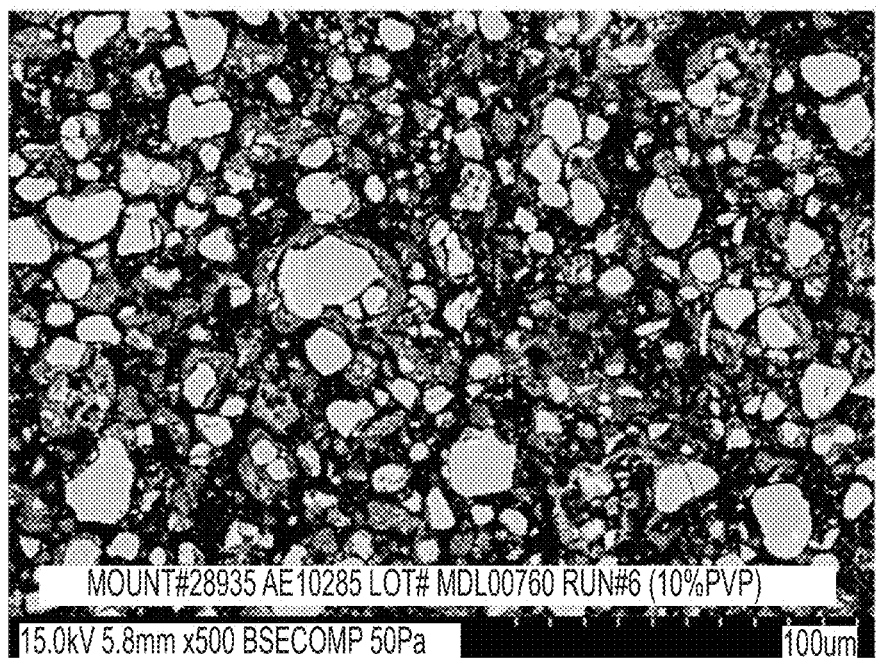
Figure 15A:
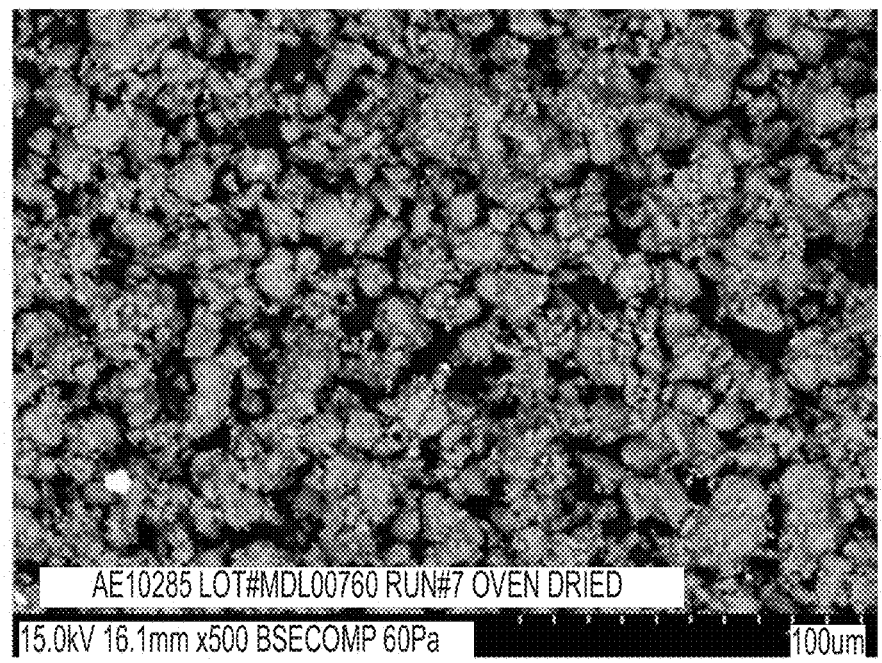
FIG. 15 shows the morphology and cross-section of a powder according to the present invention; SEM powder images (at 500×) for the MgO—$Al_2O_3$ "clad" powder (a) Morphology, (b) Cross section
Figure 15B:
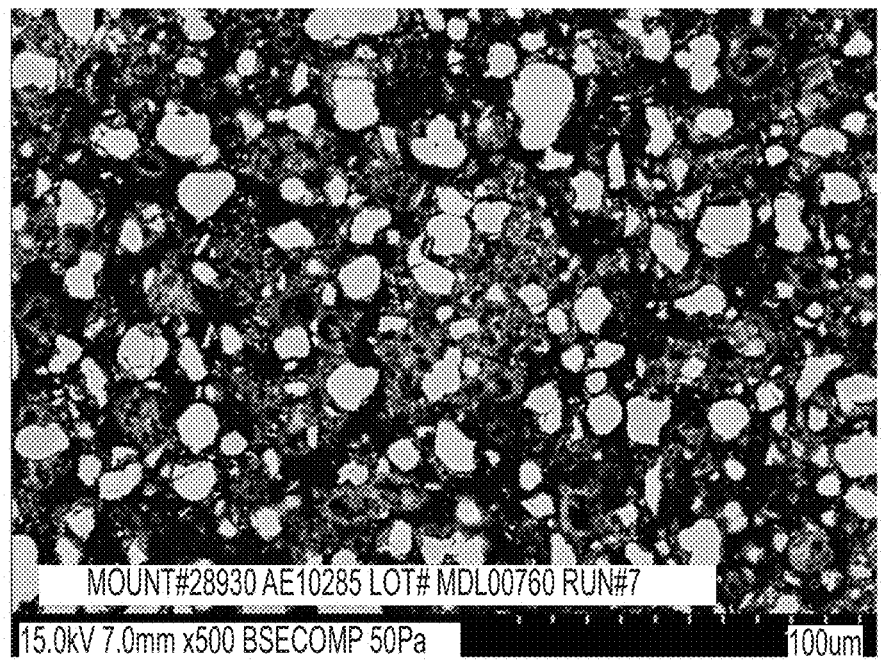
Figure 16A:
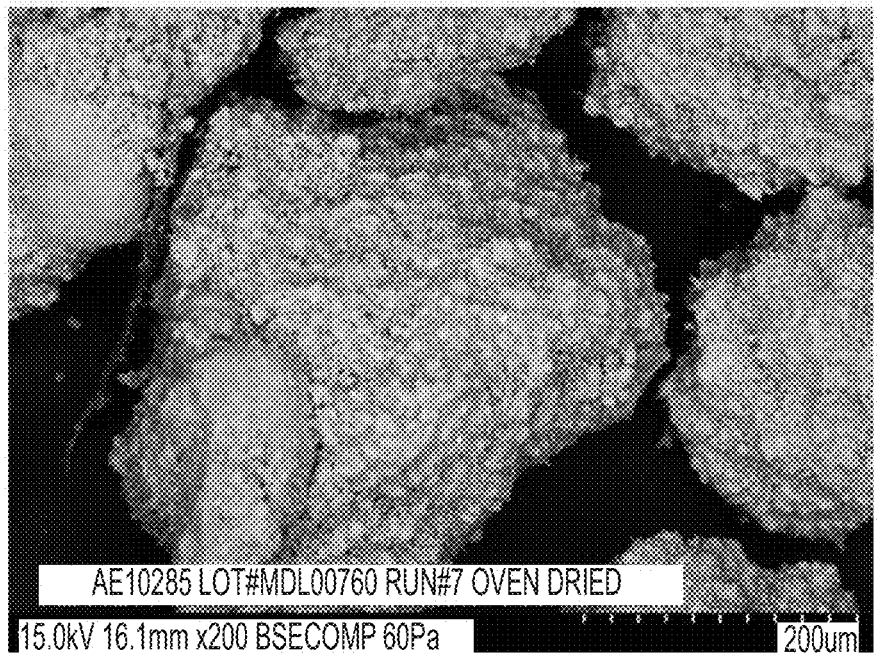
FIG. 16 shows the morphology and cross-section of a powder according to the present invention; SEM powder images (at 200×) for the MgO—$Al_2O_3$ "clad" powder (a) Morphology, (b) Cross section.
Figure 16B:
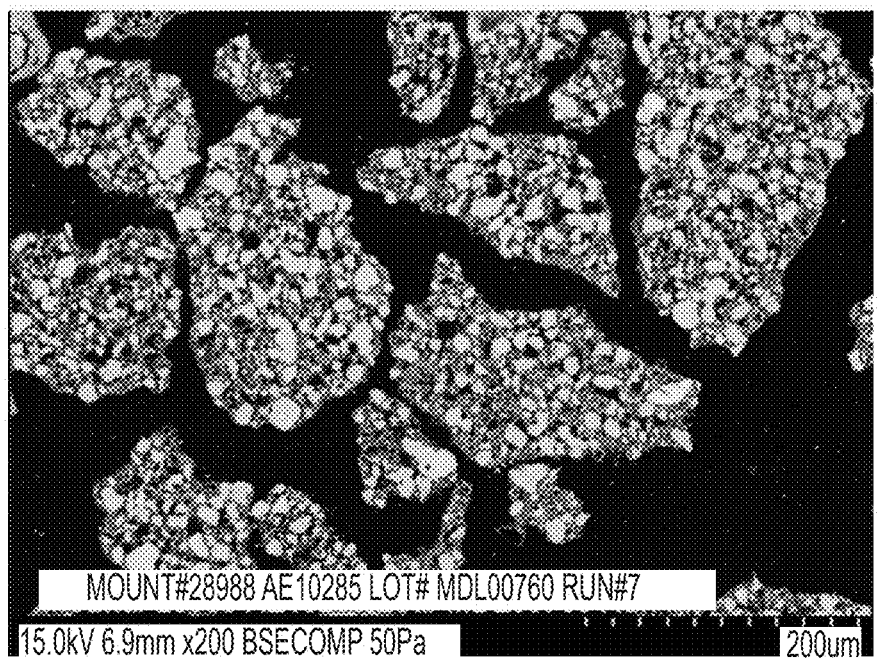

Another preferred embodiment is shown in FIG. 9, wherein multiple cores having, for example, size less than 10 microns are clad with component A. A preferred Component A for this cladding is, or comprises, a salt.

Figure 3:
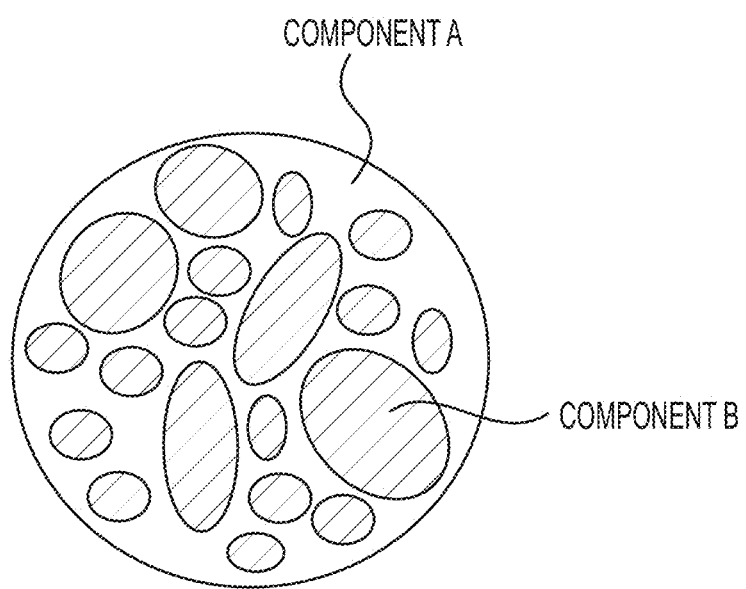
FIG. 3 is a schematic drawing illustrating a powder particle structure according to the current invention.
Figure 4:
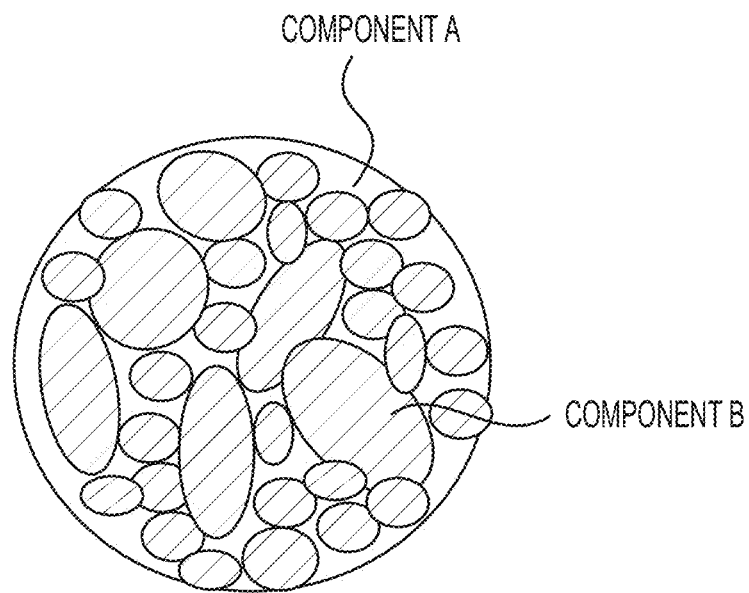
FIG. 4 is a schematic drawing illustrating a powder particle structure according to the current invention.
Figure 5:
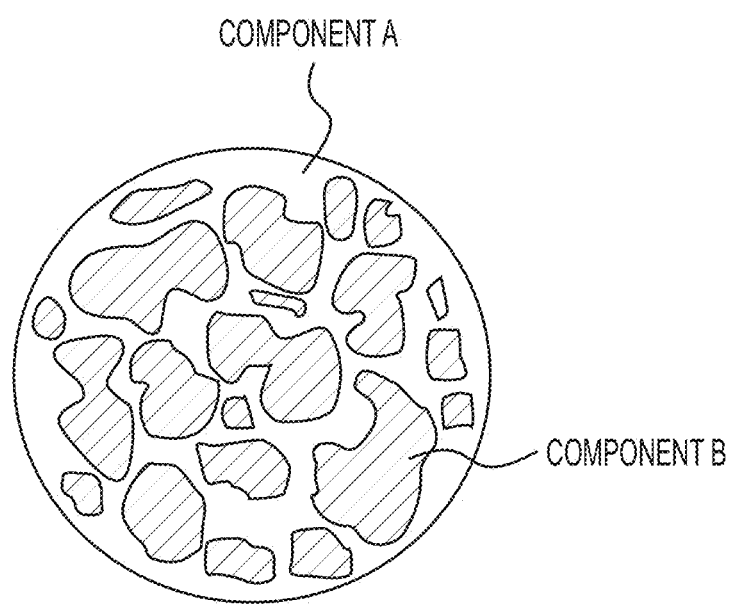
FIG. 5 is a schematic drawing illustrating a powder particle structure according to the current invention.
Figure 6:
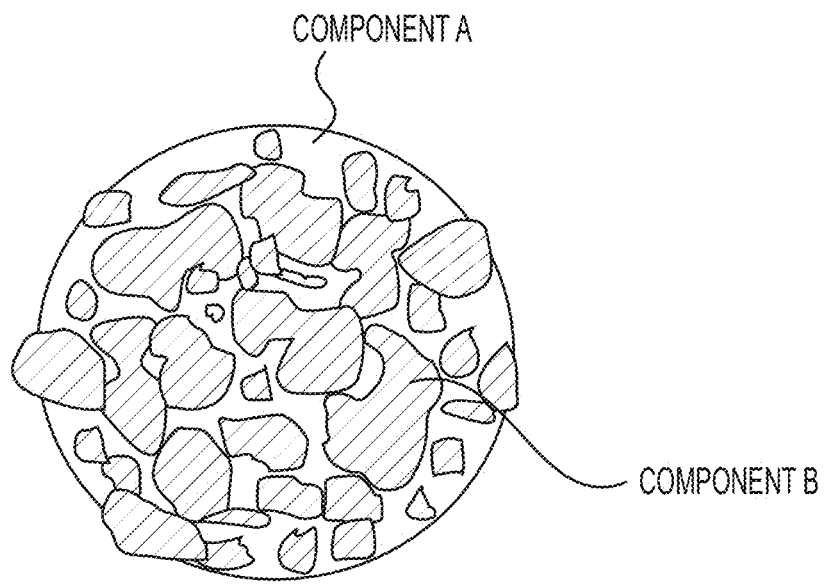
FIG. 6 is a schematic drawing illustrating a powder particle structure according to the current invention.
Figure 7:
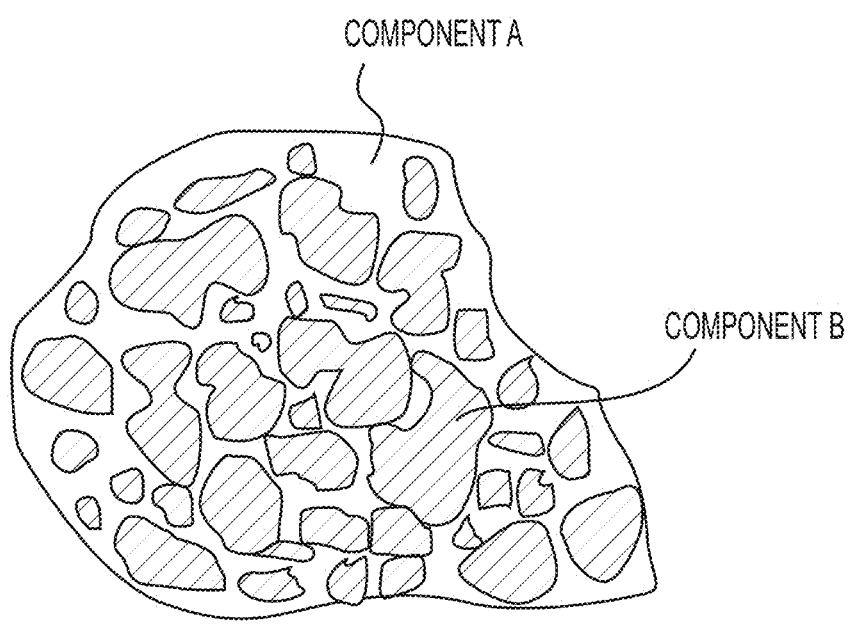
FIG. 7 is a schematic drawing illustrating a powder particle structure according to the current invention.
Figure 8:
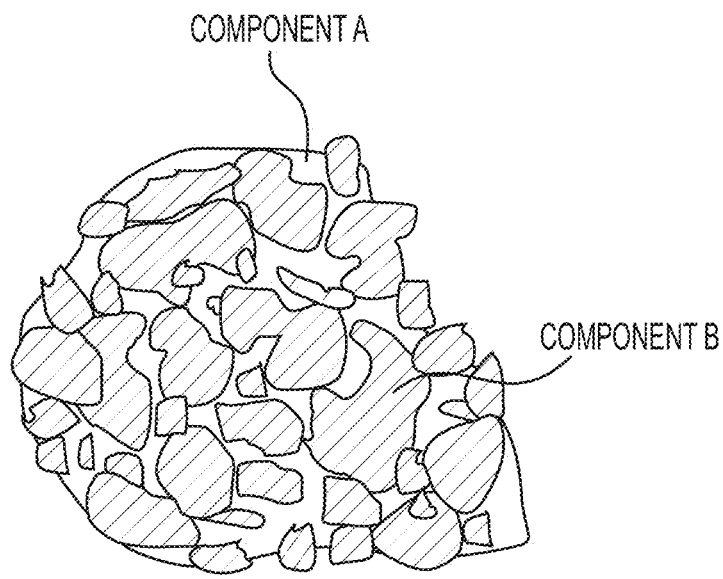
FIG. 8 is a schematic drawing illustrating a powder particle structure according to the current invention.

It can be seen in FIGS. 3 and 4 that there can be multiple coated cores that are agglomerated. In FIG. 3, component B ins completely encased in Component A. In FIG. 4, Component B is partially encased in Component A, and to a small extent is not encased. The coating on the core can be as low as a hundred nanometers, and as high as about 10 microns.

It is possible to treat the cores in various manners prior to applying core-coating. As shown in FIGS. 6-9, the cores and/or particles can be regular or irregular in shape. For example, multiple cores may be fused and crushed and then agglomerated, to obtain various configurations. When cores are agglomerated, Component A can act as a coating or glue. Some STMs showing morphologies and cross sections of materials according to the present invention are shown in FIGS. 10-16.

Materials of the present invention can be applied in any manner, preferably by thermal spray coating. Thermal spraying (often also referred to as flame spraying) is a group of processes wherein a finely divided feedstock material is heated and propelled as individual particles or droplets onto a surface to be coated (substrate). The thermal spray torch (or gun) generates the necessary heat by using combustible gases or an electric arc. As the materials are heated, they are changed to a plastic or molten state and are confined and accelerated by a compressed gas stream toward the substrate. The particles strike the substrate, flatten, and form thin platelets (splats) that conform and adhere to the irregularities of the prepared substrate and to each other. As the sprayed particles impinge upon the surface, they cool and build up, splat by splat, into a laminar structure forming the thermal spray coating.

EXAMPLES

Example 1

A powder is made according to the present invention, comprising 80 parts by weight MgO; 20 parts by weight $Al_2O_3$; 1 part by weight binder (PVA), and 0.5 parts by weight DISPEX® AA4144 dispersant.

Figure 18:
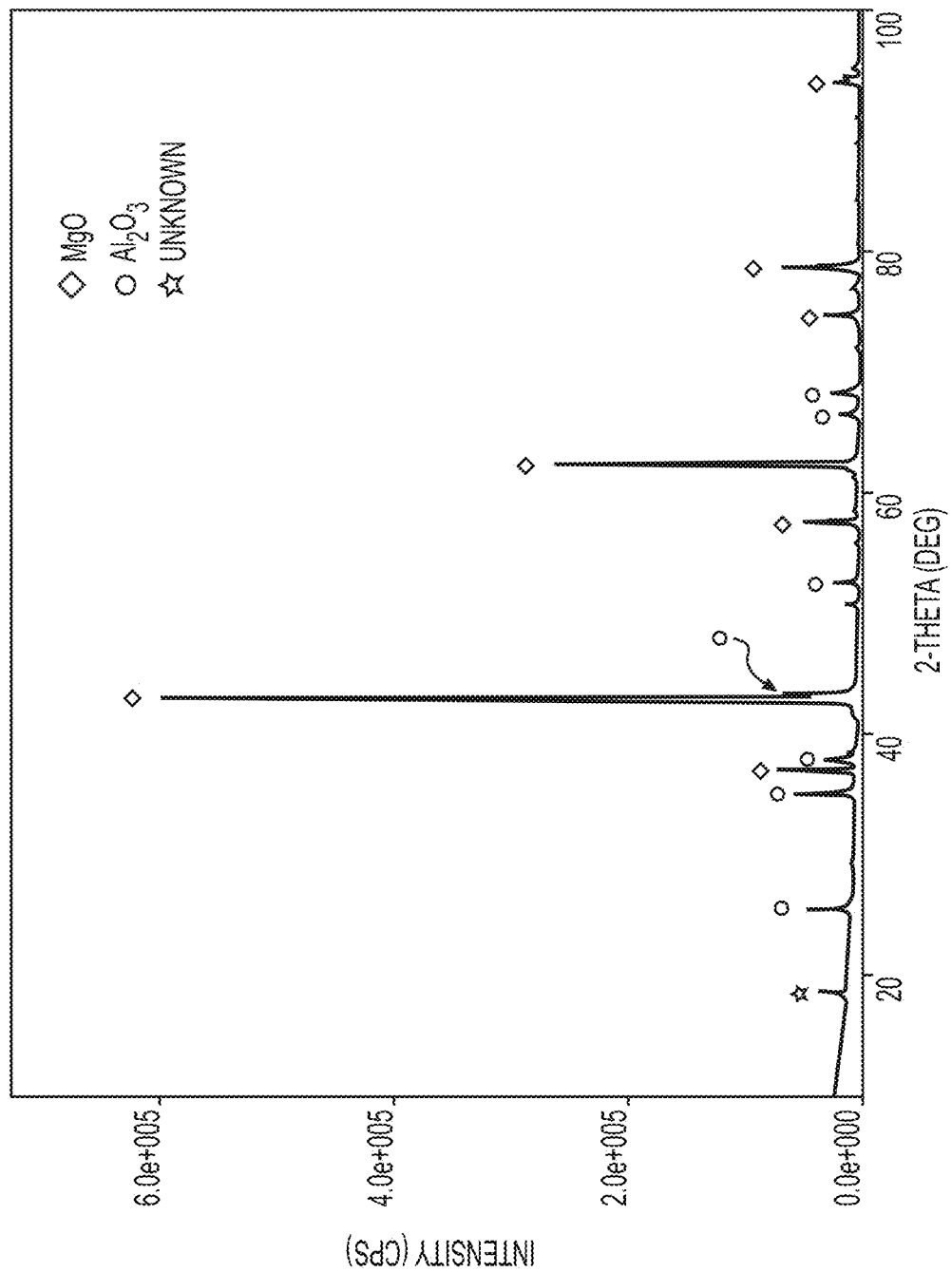
FIG. 18 is an XRD pattern for a material prepared according to Example 1.
Figure 22A:
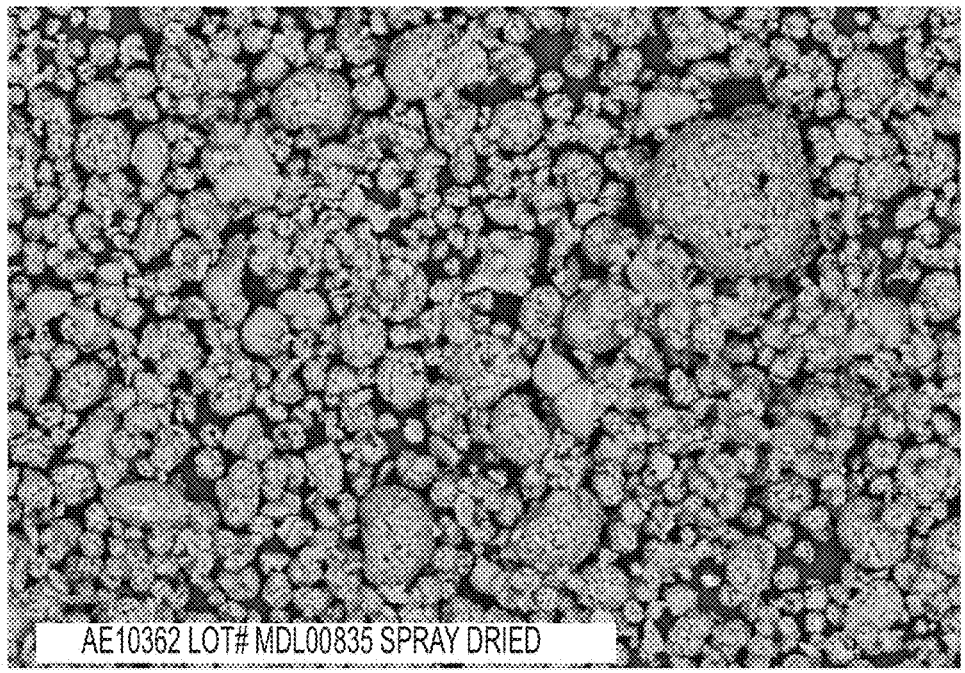
FIG. 22 shows SEM powder images (at 500×) for an MgO—$Al_2O_3$ powder: (a) Morphology, (b) Cross section.
Figure 22B:
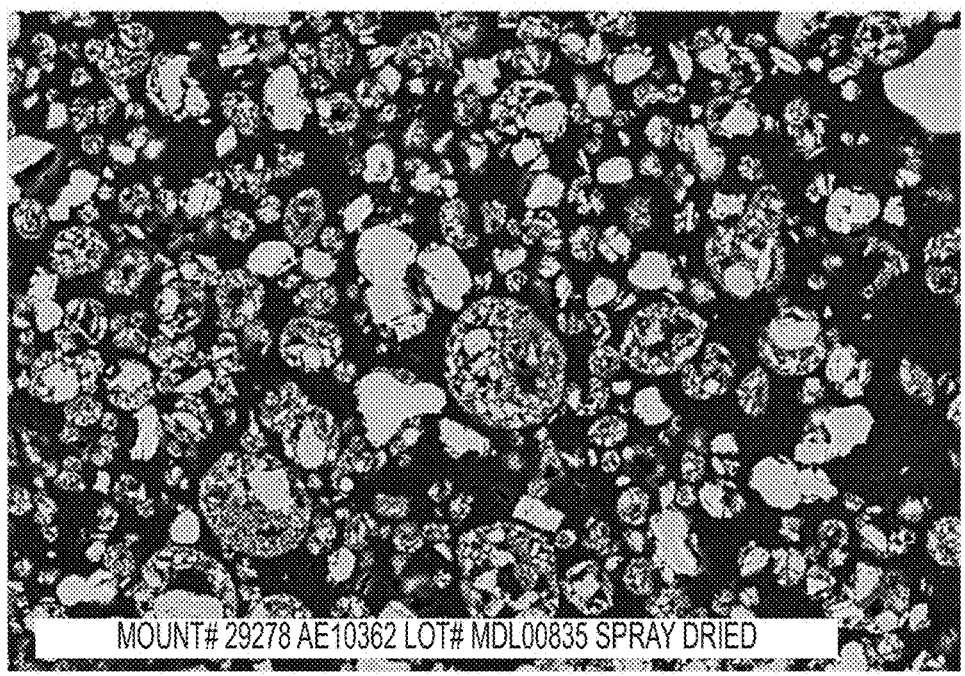

All of the $Al_2O_3$ and 10% of the total MgO are wet milled to <3 um to create a fine sized intimate mixture. The remaining MgO (somewhat coarser in size) is added to DI water along with PVA, the dispersant and the mixture created above. The viscosity of the final slurry is maintained at 6.7 s (Zahn cup #4). The resulting slurry is then spray dried to achieve the desired particle size. The resulting powder has a core-shell structure, and a mean particle size of 16-17 um. An XRD of the material is shown in FIG. 18. SEM images showing morphology and cross-section are shown in FIG. 22.

Example 2

A powder is made according to the present invention, comprising 80 parts by weight MgO; 20 parts by weight $Al_2O_3$; 1 part by weight binder (PVA), and 0.5 parts by weight dispersant DISPEX AA 4144®.

Figure 20:
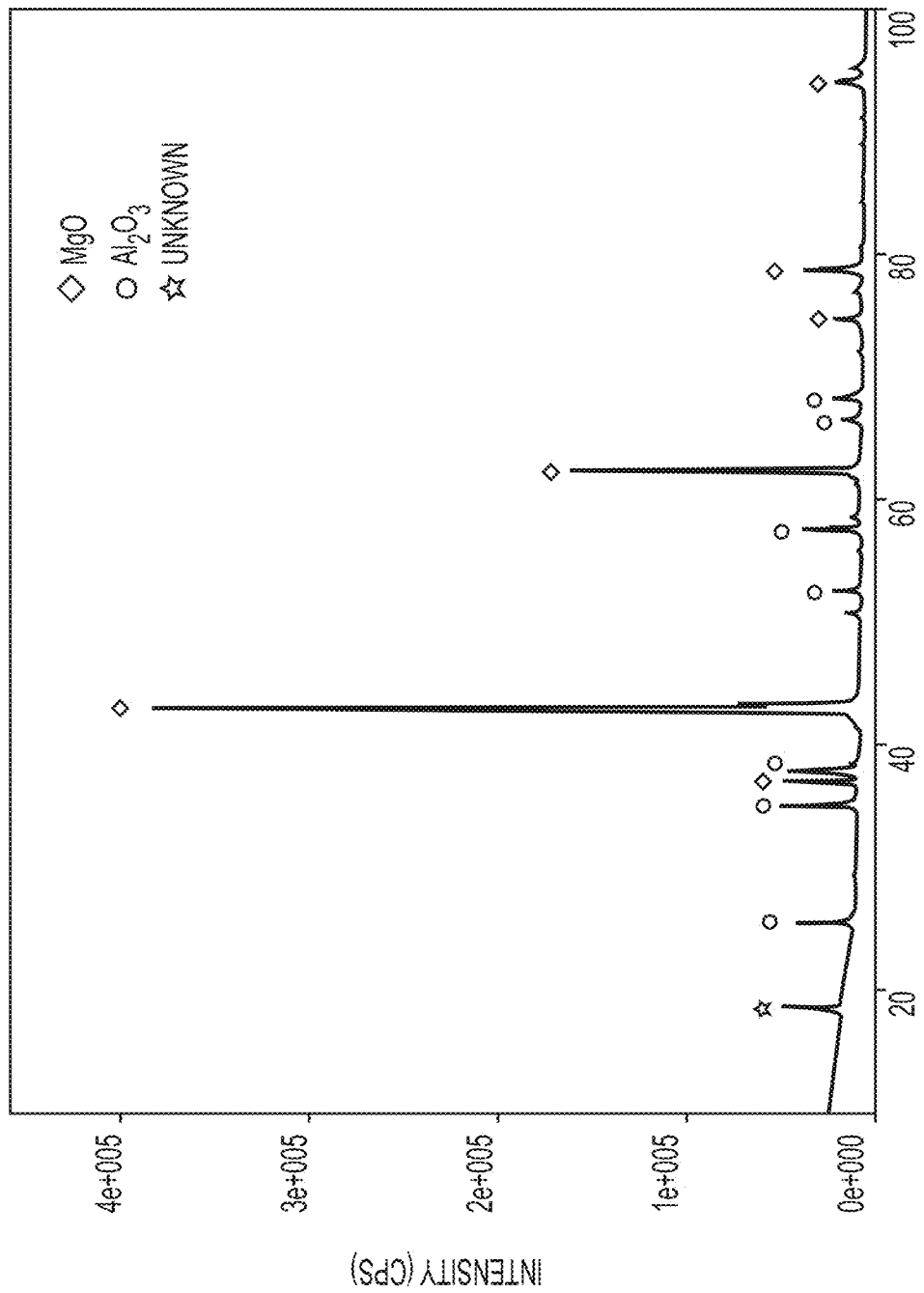
FIG. 20 is an XRD pattern for a material prepared according to Example 2.
Figure 23A:
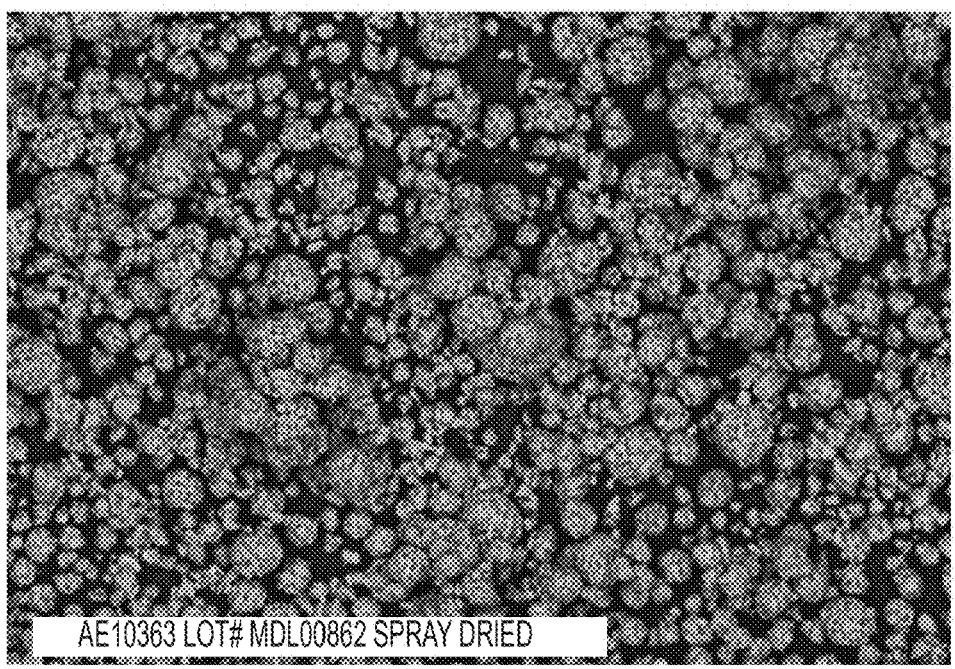
FIG. 23 shows SEM powder images (at 500×) for an MgO—$Al_2O_3$ powder: (a) Morphology, (b) Cross section.
Figure 23B:
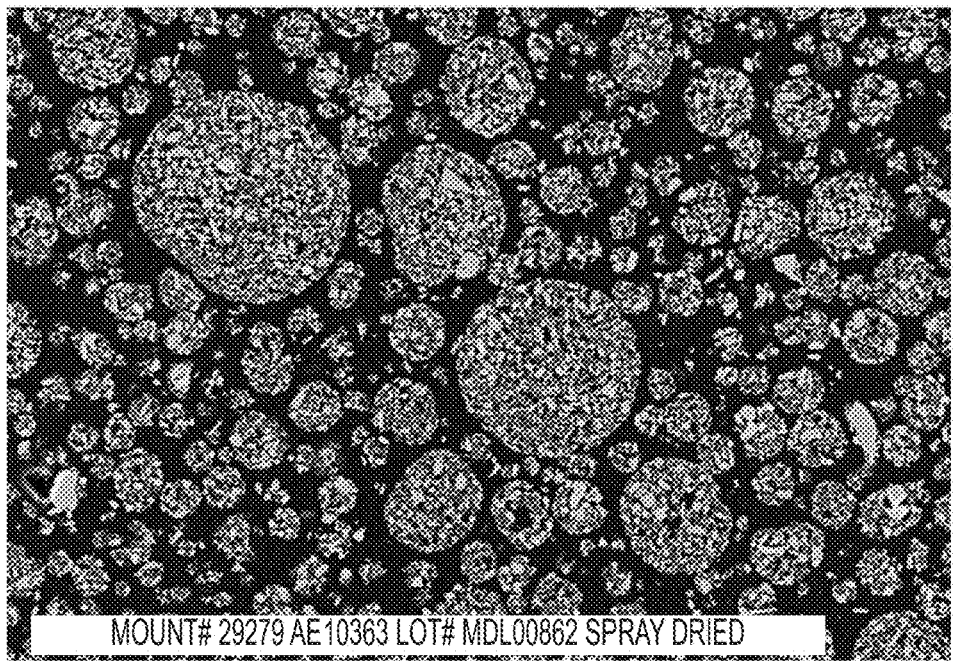

All of the $Al_2O_3$ and MgO is wet milled to <3 um to create a fine-sized intimate mixture. DI water along with PVA, and DISPEX AA 4144® is added to mixture to adjust its properties. The viscosity of the final slurry is maintained at 7.5 s (Zahn cup #4). The resulting slurry is then spray dried to achieve the desired particle size. The resulting powder has mean particle size of 16-17 um, and is an intimate mixture that is believed to have a structure similar to that of FIG. 10. An XRD of the material is shown in FIG. 20. SEM images showing morphology and cross-section are shown in FIG. 23.

Example 3

MgO-Spinel Coatings

Materials from Examples 1 and 2 are used to make coatings. For comparative purposes, a coating is also made from a spinel-containing comparative material comprising MgO as a major phase, and $MgAl_2O_4$ as a minor phase, the comparative material made according to U.S. Pat. No. 6,723,442.

The powders are thermally sprayed onto 1"×3" aluminum substrates using a METCO® 9MB torch, G nozzle, and standard electrode and powder port clamps, using a single #2 or #6 powder port. Carrier gas flow is 3.7 or 2.7 nlpm, and the powder feed rate is 22.5 g/min. The surface speed is 150 ft/min, rotational speed is 48 rpm, the part diameter is 12 in., the step size is 0.19 in., and the traverse rate is 4 mm/s. The material is ejected onto an aluminum substrate with a 2.5 inch spray distance. Other parameters are as shown in Table 1.

TABLE 1

| Parameter | units | L1 Ex. 1 | L2 Ex. 2 | L3 Ex. 2 | L4 Ex. 1 | L5 Ex. 1 | L6 Ex. 1 | L7 Ex. 1 | L8 Ex. 2 | L9 Ex. 2 | comp. comp. |
|---|---|---|---|---|---|---|---|---|---|---|---|
| powder port | # | 6 | 6 | 6 | 2 | 2 | 6 | 6 | 6 | 6 | 6 |
| gun current | A | 700 | 700 | 700 | 500 | 700 | 700 | 700 | 700 | 700 | 700 |
| jambox voltage | V | 63.0 | 60.7 | 58.5 |  | 62.3 | 60.7 | 58.4 | 60.6 | 62.7 | 63.5 |
| gun power | kW | 44.0 | 42.3 | 40.8 |  | 43.1 | 42.3 | 44.3 | 42.3 | 43.7 | 44.3 |
| nitrogen flow | nlpm | 38 | 30 | 24 | 30 | 30 | 30 | 24 | 30 | 38 | 38 |
| carrier gas | nlpm | 3.7 | 3.7 | 3.7 | 3.7 | 3.7 | 3.7 | 2.7 | 3.7 | 3.7 | 2.7 |
| notes |  | 1 | 2 | 2 | 1 | 1 | 1 | 1 | 2 | 2 |  |

1) One preheat cycle at 4 mm/s; Multicoat/PT1220.
2) One preheat cycle at 4 mm/s; 2 min DE (3 cycles); Multicoat/PT1220.

Figure 19:
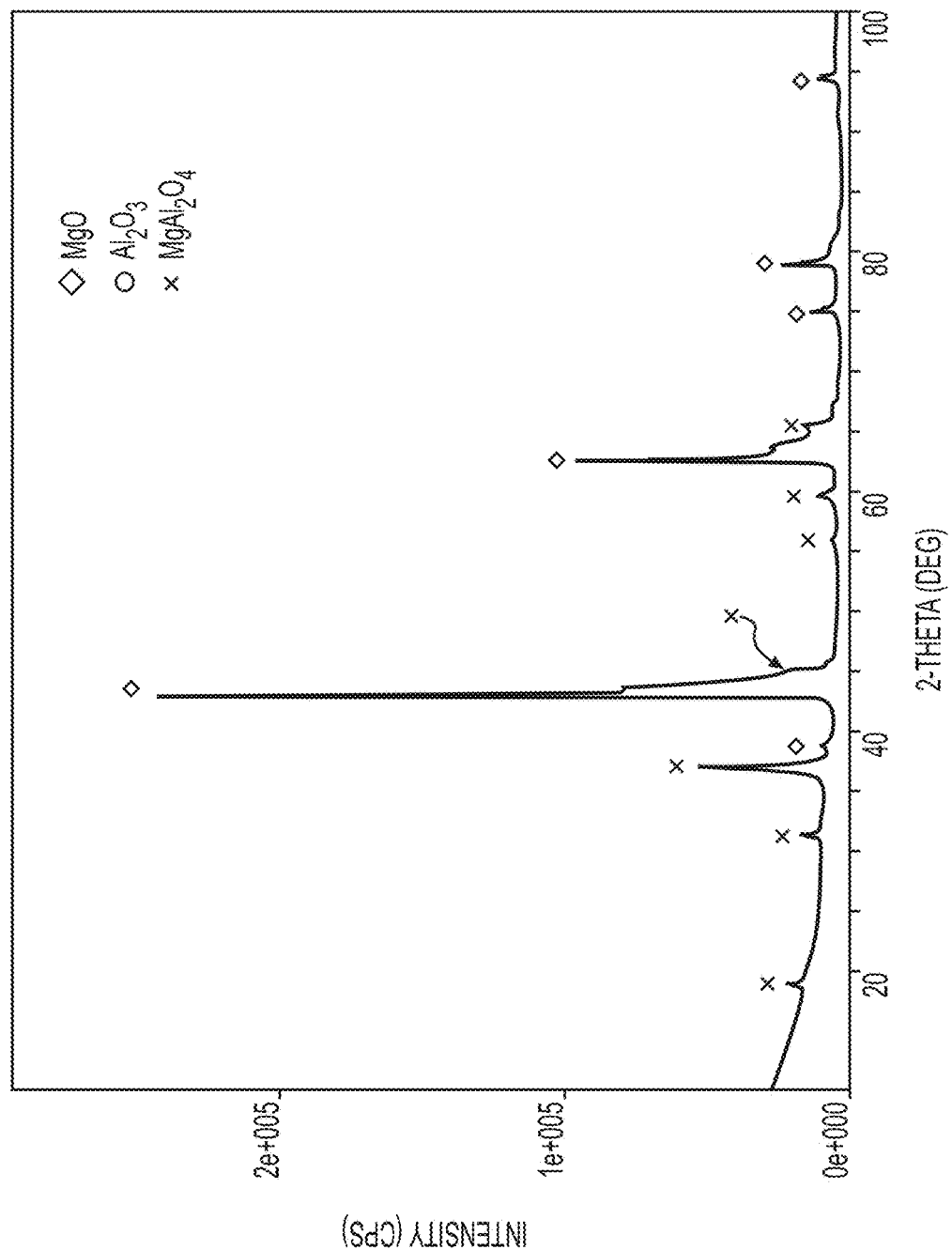
FIG. 19 is an XRD of a coating prepared by thermally spraying material prepared according to Example 1.
Figure 21:
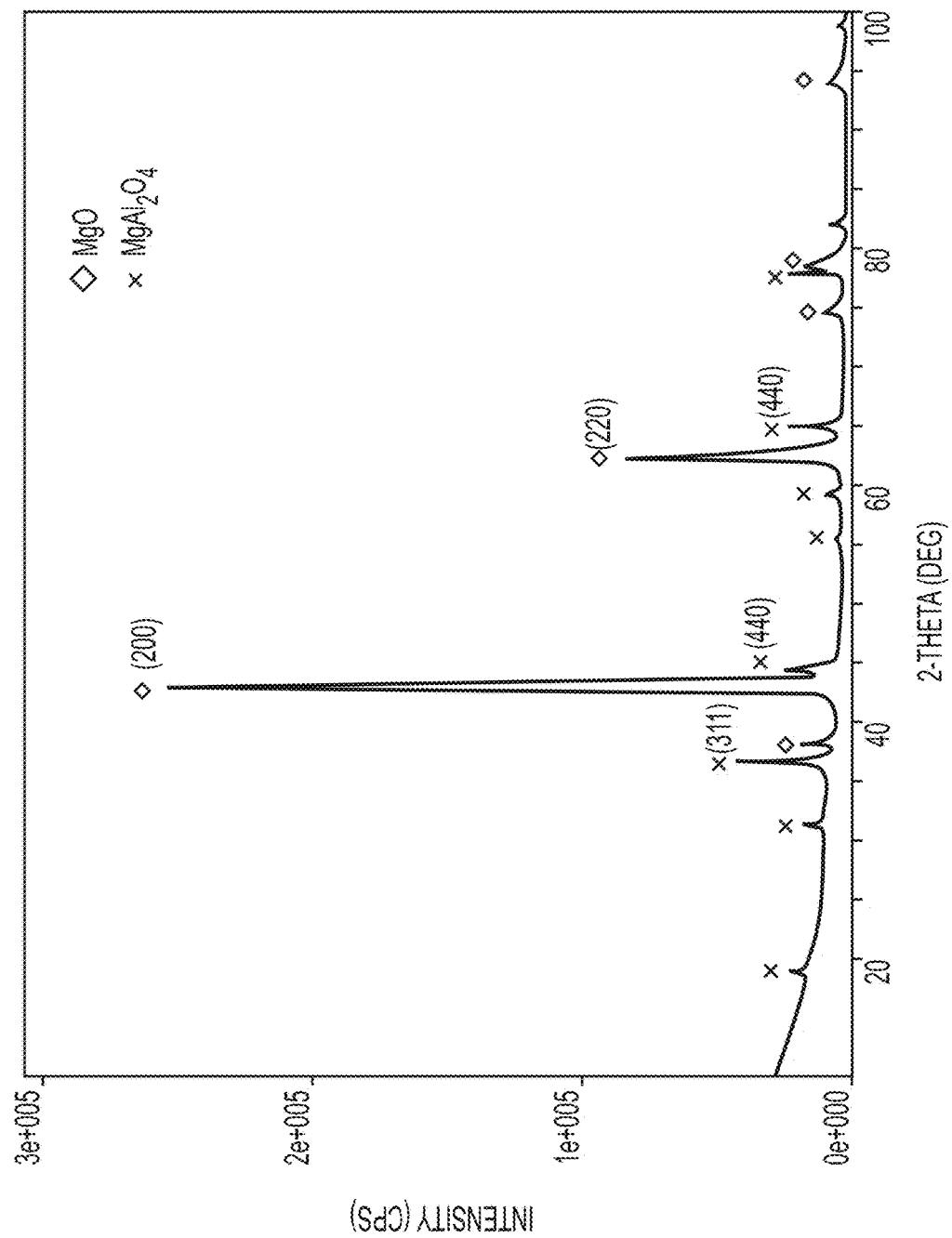
FIG. 21 is an XRD of a coating prepared by thermally spraying material prepared according to Example 2.

The thermally sprayed layers of L1, L2, L3, and the comparative example are then analyzed by x-ray diffraction. The results are shown in Table 2. The XRDs of L1 and L2 are shown in FIGS. 19 and 21, respectively.

TABLE 2

| Powder | Coating Phase Analysis |
|---|---|
| Coatings L1-L3 | MgO (periclase) - Major phase<br>$MgAl_2O_4$ (spinel) - Minor<br>$Al_2O_3$ - not detected |
| Comparative Example | MgO (periclase) - Major phase<br>$MgAl_2O_4$ (spinel) - Minor<br>$Al_2O_3$ - not detected |

Even though the powders of Examples 1 and 2 comprise no spinel, the coatings prepared therefrom surprisingly comprise effective amounts of spinel. Moreover, even though the powders of Examples 1 and 2 comprise significant amounts of $Al_2O_3$, $Al_2O_3$ is surprisingly not detected in the coatings.

Example 4

A salt-based powder is made by agglomeration using a conventional spray drying system. The slurry contains MgO powder with a mean diameter of 2 to 5 µm and a water soluble alumina nitrite salt ($Al(NO_3)_3.9H_2O$). The weight ratio is 80% MgO and 20% salt. Water is used as a carrier during the agglomerating process. It is believed that the salt functions as a binder which glues the agglomerates during the spray drying process. It is believed that the microstructure of an individual agglomerate is similar to FIG. 8 or 9.

The powder is thermally sprayed using a conventional HVOF torch (DIAMONDJET® 2600) with hydrogen as combustion gas. Plain steel substrate is used. The trajectory of the torch is a meander pattern.

Figure 17:
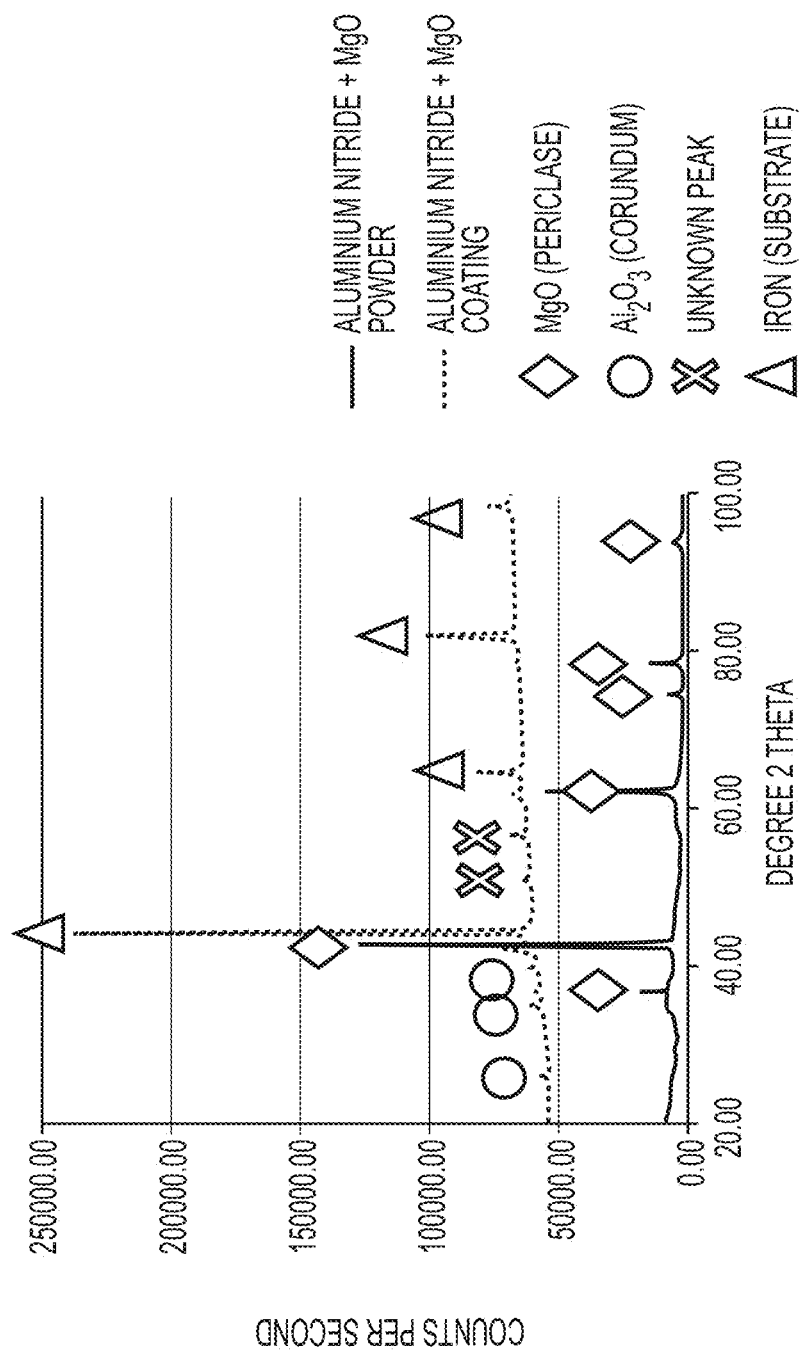
FIG. 17 shows XRD patterns of an MgO/Aluminum nitride powder, and a coating made therefrom on a steel substrate.

FIG. 17 shows an XRD diagram of MgO and aluminum nitride powder (lower line), and the coating made therefrom by thermal spraying (upper line). As can be seen, the XRD of the powder shows it comprises MgO. It is believed that the aluminum salt cannot be detected because the spray-dry manufacturing process renders the aluminum salt amorphous. The coating, however, shows reflections of pure MgO and $Al_2O_3$ (corundum). The major peaks are iron as the substrate is only covered with a thin (5 to 10 µm) coating. This demonstrates that it is possible to deposit MgO glued by a second phase (corundum or spinel) by thermal spraying.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims, as presently stated and as amended.

What is claimed:

1. A material comprising a particle comprising a core portion comprising a first mixture, and an encasing portion comprising a second mixture,
the first mixture comprising at least 50 mol % of a high-CTE material (component B1) and comprising less than 50 mol % of a non-sublimating electrical insulator (component A1);
the second mixture comprising at least 50 mol % of a non-sublimating electrical insulator (component A2) and comprising less than 50 mol % of a high-CTE material (component B2); and
wherein at least one of component A1 and component B1 has an average particle size up to about 100 microns;
at least one of component A2 and component B2 has an average particle size up to about 20 microns; and
component B1 having a coefficient of thermal expansion (CTE) at least about 10 µm/m/K;
wherein the encasing portion at least partially encases the core portion, and wherein the material comprises essentially no spinel.

2. The material of claim 1, wherein component A1 and component A2 are independently chosen from one or both of a) one or more oxide of trivalent or tetravalent metals, or b) one or more salts with binding properties.

3. The material of claim 1, wherein component A1 and component A2 are independently chosen from one or more of oxide of Al, In, Ga, Y, Sc, Mg, Si, Ti, Ge, Zr, Hf, Sn, Nb, Mn, or a rare earth metal.

4. The material of claim 1, wherein component A1 and component A2 comprise $Al_2O_3$.

5. The material of claim 1, wherein component B2 has a coefficient of thermal expansion at least about 10 µm/m/K.

6. The material of claim 1, wherein component B1 and component B2 are independently chosen from one or more of a simple oxide, a double oxide, a triple oxide, an alkali metal halide, an alkaline metal halide, or a metal.

7. The material of claim 1, wherein component B1 and component B2 comprise MgO.

8. The material of claim 1, comprising a plurality of cores.

9. The material of claim 8, wherein the cores comprise particles that are at least one of monolithic or an agglomerate of smaller particles.

10. The material of claim 1, comprising a plurality of agglomerated encased cores.

11. The material of claim 1, wherein the core further comprises an outer layer that is non-electrically conducting and non-sublimating.

12. The material of claim 11, wherein the outer layer comprises one or both of a) one or more oxides of trivalent or tetravalent metals, or b) one or more salt with binding properties.

13. The material of claim 1, further comprising a binder.

14. The material of claim 1, further comprising a dispersant.

15. A thermal spray coating prepared by thermally spraying the material of claim 1 onto a substrate.

16. The thermal spray coating of claim 15, the thermal spray coating comprising one or more spinel.

17. The thermal spray coating of claim 15, wherein the substrate comprises at least one of iron, steel, aluminum, copper, Fe—Cr alloy, Cr-rich steel, cobalt, Co-alloy, nickel, Ni-alloy, bronze, or titanium.

18. A particle comprising a core portion comprising a first mixture, and an encasing portion comprising a second mixture,
the first mixture comprising at least 50 mol % of a high-CTE material having CTE greater than or about 10 µm/m/K (component B1) and comprising less than 50 mol % of a non-sublimating electrical insulator (component A1);
the second mixture comprising at least 50 mol % of in a non-sublimating electrical insulator (component A2) and comprising less than 50 mol % of a high-CTE material (component B2); and
wherein at least one of component A1 and component B1 has an average particle size up to about 100 microns;
at least one of component A2 and component B2 has an average particle size up to about 20 microns; and
wherein the encasing portion at least partially encases the core portion, and wherein the particle comprises essentially no spinel.

19. A method of manufacturing a thermal spray coating comprising:
   obtaining a material according to claim 1;
   obtaining a substrate; and
   forming a coating on the substrate by applying the material to the substrate by a thermal spray process.

20. The method of claim 19, wherein the material does not comprise spinel, and the thermal spray coating comprises a spinel.

21. The method of claim 19, wherein the material comprises $Al_2O_3$, and the thermal spray coating does not comprise $Al_2O_3$.

22. The method of claim 19, wherein the substrate comprises at least one of iron, steel, aluminum, copper, Fe—Cr alloy, Cr-rich steel, cobalt, Co-alloy, nickel, Ni-alloy, bronze, or titanium.

* * * * *